US010553381B2

(12) United States Patent
Kim et al.

(10) Patent No.: US 10,553,381 B2
(45) Date of Patent: Feb. 4, 2020

(54) ELECTRICAL SWITCHGEAR FOR OVERCURRENT PROTECTION USING CRITICAL TEMPERATURE DEVICE

(71) Applicant: ELECTRONICS AND TELECOMMUNICATIONS RESEARCH INSTITUTE, Daejeon (KR)

(72) Inventors: Hyun-Tak Kim, Daejeon (KR); Sungwoo Jo, Daejeon (KR); Sun-Kyu Jung, Ulsan (KR); Jin-cheol Cho, Cheongju-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 601 days.

(21) Appl. No.: 15/001,804

(22) Filed: Jan. 20, 2016

(65) Prior Publication Data

US 2016/0233040 A1    Aug. 11, 2016

(30) Foreign Application Priority Data

Jan. 20, 2015  (KR) .................... 10-2015-0009307
Nov. 12, 2015  (KR) .................... 10-2015-0159021

(51) Int. Cl.
*H01H 47/26* (2006.01)
*H02H 3/08* (2006.01)
(Continued)

(52) U.S. Cl.
CPC ............. *H01H 47/26* (2013.01); *G05F 5/00* (2013.01); *G08B 21/18* (2013.01); *H01C 7/008* (2013.01);
(Continued)

(58) Field of Classification Search
CPC ........ H02H 3/085; H02H 5/042; H02H 5/043; H01H 47/26
See application file for complete search history.

(56) References Cited

U.S. PATENT DOCUMENTS 4,283,674 A * 8/1981 Kominami ................ G05F 3/18
323/313
4,625,137 A * 11/1986 Tomono ................ H01L 41/094
310/317
(Continued)

FOREIGN PATENT DOCUMENTS

CN    101910964 A    12/2010
CN    103001177 A    3/2013
(Continued)

*Primary Examiner* — Thienvu V Tran
*Assistant Examiner* — Christopher J Clark
(74) *Attorney, Agent, or Firm* — Rabin & Berdo, P.C.

(57) ABSTRACT

The present disclosure discloses an electrical switchgear configured to control an electro-magnet by using the electro-magnet, a critical temperature device, and an electro-magnet control unit without using a bimetal and a mechanical contact. The electro-magnet switches power applied through a power line in response to a flow of control current to a power device connected to a load side. In a critical temperature device, an output current value varies when a temperature of a heating wire, which is connected to the power line, exceeds a critical temperature by supply current flowing to the power device. An electro-magnet control unit, which is realizable with an SCR, allows a flow of control current of the electro-magnet to be generated or cut off in response to the output current value of the critical temperature device.

42 Claims, 26 Drawing Sheets

(51) Int. Cl.
*H02H 5/04* (2006.01)
*H01H 47/32* (2006.01)
*G05F 5/00* (2006.01)
*G08B 21/18* (2006.01)
*H01C 7/00* (2006.01)

(52) U.S. Cl.
CPC ............ *H01H 47/32* (2013.01); *H02H 3/085* (2013.01); *H02H 5/043* (2013.01)

(56) References Cited

U.S. PATENT DOCUMENTS

| | | | | |
|---|---|---|---|---|
| 4,707,686 A * | 11/1987 | Greenhalgh | ............ | H02H 5/043 219/505 |
| 4,784,142 A * | 11/1988 | Liss | ........................ | A61N 1/326 607/148 |
| 4,994,651 A * | 2/1991 | Jones | .................... | H02H 3/023 219/494 |
| 5,025,169 A * | 6/1991 | Arakawa | .............. | G01N 21/255 250/214 R |
| 5,283,708 A | 2/1994 | Waltz | | |
| 5,998,883 A * | 12/1999 | Yamazaki | .................. | B60S 1/08 307/10.1 |
| 6,288,597 B1 * | 9/2001 | Hasegawa | .......... | H03K 17/0828 327/403 |
| 6,349,022 B1 * | 2/2002 | Myong | .................... | H02H 3/025 361/57 |
| 6,512,444 B1 * | 1/2003 | Morris, Jr. | ............. | H02H 5/042 219/510 |
| 6,989,976 B2 | 1/2006 | Ashiya | | |
| 7,408,217 B2 | 8/2008 | Yoon et al. | | |
| 8,536,554 B2 | 9/2013 | Kim et al. | | |
| 8,563,903 B2 | 10/2013 | Kim et al. | | |
| 8,891,220 B2 | 11/2014 | Shimizu et al. | | |
| 9,768,319 B2 | 9/2017 | Kamata | | |
| 2003/0123205 A1 * | 7/2003 | Ashiya | .................... | H02H 3/085 361/93.1 |
| 2006/0164060 A1 * | 7/2006 | Itoh | ........................ | G05F 1/575 323/313 |
| 2010/0007447 A1 * | 1/2010 | Mernyk | ............... | H02H 11/002 335/7 |
| 2010/0122976 A1 * | 5/2010 | Kim | ........................ | H01C 7/008 219/501 |
| 2010/0157542 A1 * | 6/2010 | Choi | ..................... | H05K 1/0201 361/717 |
| 2010/0201327 A1 * | 8/2010 | Takeda | ..................... | H01M 2/34 320/154 |
| 2011/0006830 A1 * | 1/2011 | Kim | .................... | H01L 21/8222 327/478 |
| 2011/0018607 A1 * | 1/2011 | Kim | ........................ | H01L 23/62 327/478 |
| 2011/0102052 A1 * | 5/2011 | Billingsley | ............ | H01H 9/542 327/365 |
| 2011/0291869 A1 * | 12/2011 | Utsuno | .................... | G01K 7/24 341/132 |
| 2012/0170164 A1 * | 7/2012 | Shimizu | .................. | H02H 5/043 361/63 |
| 2012/0187089 A1 * | 7/2012 | Chen | ....................... | H01H 33/14 218/2 |
| 2013/0135781 A1 * | 5/2013 | Natili | ........................ | H02H 3/20 361/91.2 |
| 2014/0183180 A1 * | 7/2014 | Watakabe | ................ | H05B 3/36 219/478 |
| 2014/0210628 A1 * | 7/2014 | Kim | ........................ | G08B 17/06 340/590 |

FOREIGN PATENT DOCUMENTS

| | | |
|---|---|---|
| JP | H04255414 A | 9/1992 |
| JP | 2003189460 A | 7/2003 |
| JP | 2011503895 A | 1/2011 |
| JP | 2012029545 A | 2/2012 |
| JP | 5762723 B2 | 8/2015 |
| KR | 10-1999-0065067 | 8/1999 |
| KR | 10-2009-0066549 A | 6/2009 |
| KR | 10-2009-0130992 A | 12/2009 |
| KR | 10-0964186 B1 | 6/2010 |
| WO | WO 98/45920 A1 | 10/1998 |
| WO | WO 2009-107993 A2 | 9/2009 |
| WO | WO 2009-107993 A3 | 9/2009 |

* cited by examiner

FIG. 1A
FIG. 1B
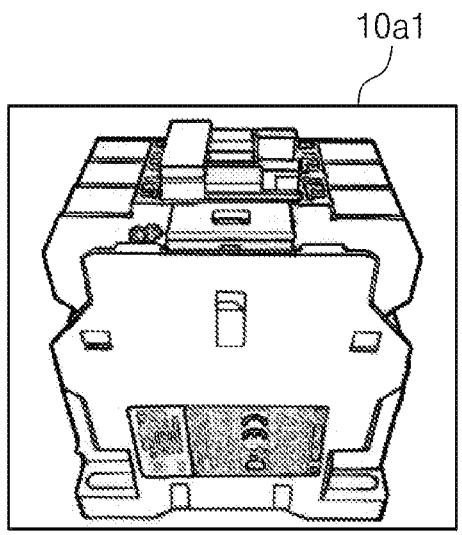
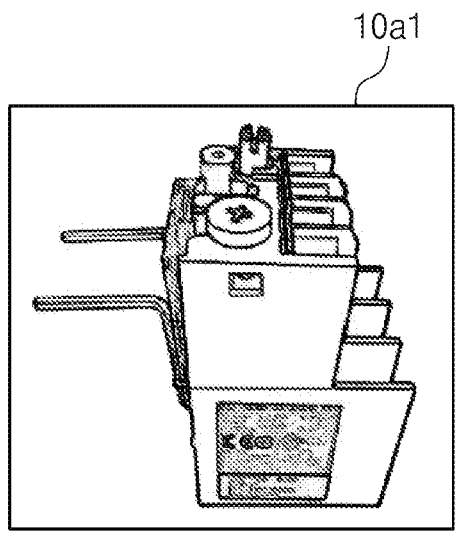
FIG. 1C
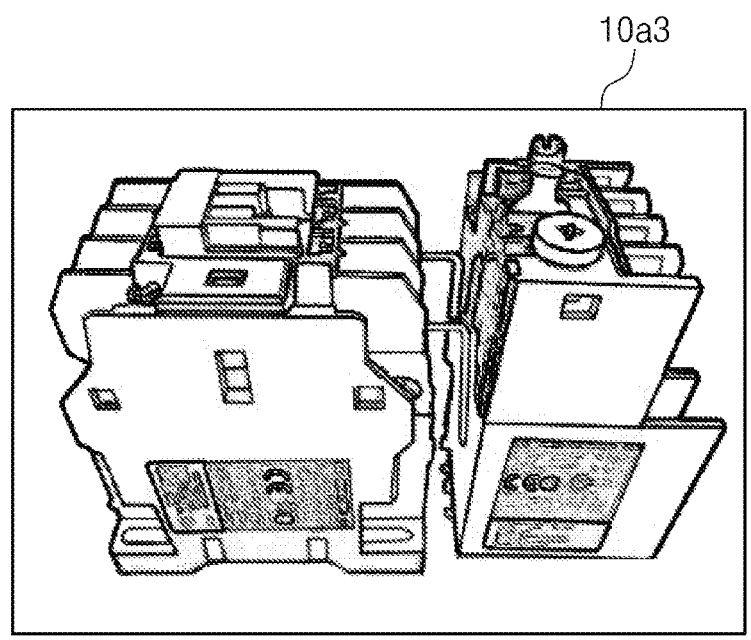

FIG. 2A
FIG. 2B
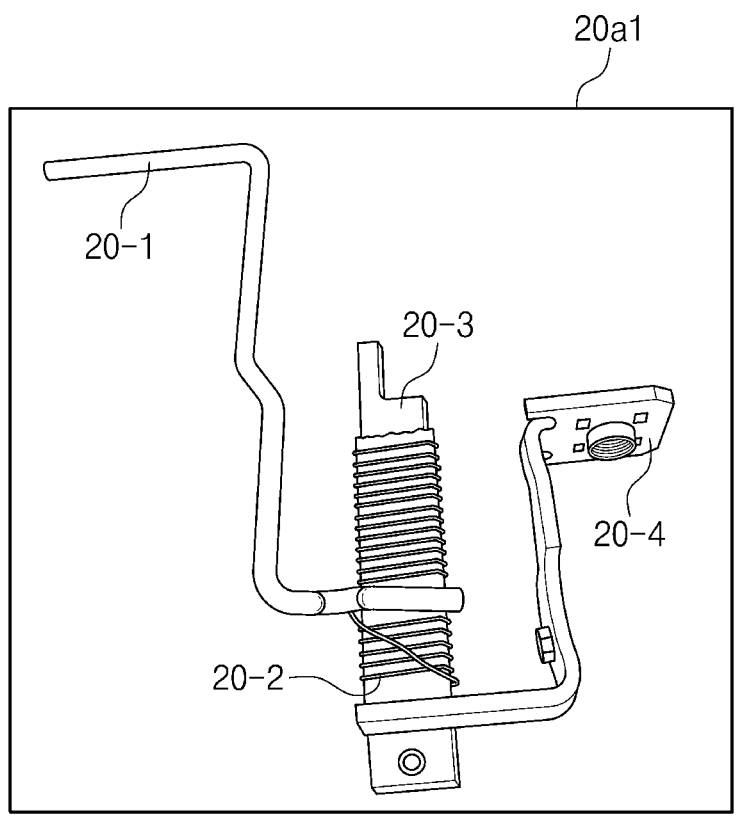
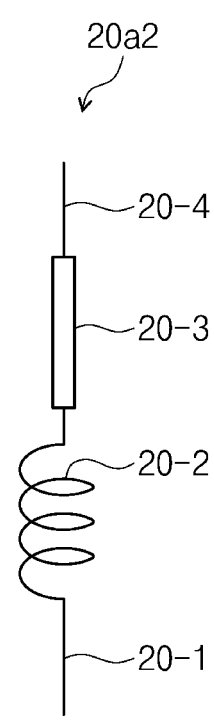

ELECTRICAL SWITCHGEAR FOR OVERCURRENT PROTECTION USING CRITICAL TEMPERATURE DEVICE

CROSS-REFERENCE TO RELATED APPLICATIONS

This U.S. non-provisional patent application claims priority under 35 U.S.C. § 119 of Korean Patent Application Nos. 10-2015-0009307, filed on Jan. 20, 2015, and 10-2015-0159021, filed on Nov. 12, 2015, the entire contents of which are hereby incorporated by reference.

BACKGROUND

The present disclosure herein relates to an electrical switchgear, and more particularly, to an electrical switchgear using a metal-insulator transition critical temperature switch.

Typically an electrical switchgear for overcurrent protection is configured with a combination of a magnetic contactor (MC) including an electro-magnet and a thermal overload relay as shown in 10a3 of FIG. 1.

An electro-magnet has a very simple structure and an electromagnetic function by the Lenz law like a coil type solenoid provided by winding a conductive wire around a metal. The electro-magnet becomes a magnet when current flows through the coil and loses the magnetic function when the current stops flowing through the coil.

A magnetic contactor 10a1 is switched on or off on the basis of a force generated by the electro-magnet to allow power to be supplied to or cut off about a power equipment.

On the other hand, a thermal overload relay 10a2 has a structure in which a nichrome wire and a bimetal are serially connected to an operation power line 2-1, which extends through the magnetic contactor 10a1 as shown in FIG. 2. In this case, heat of the nichrome wire 20-2 is delivered well to the bimetal 20-3 according to a type in which the nichrome wire 20-2 is wound around the bimetal 203.

When overcurrent flows through the power line, the bimetal may be bent by the heat of the nichrome wire. Due to the bent phenomenon of the bimetal, as shown in FIG. 3, when a mechanical relay contact is taken off, power supplied from the power line 20-1 to a terminal block 20-4 is cut off. However, when the relay contact is taken on or off, a spark flies between relay contacts. When the thermal overload relay is used for a long time, there are several cases where the spark causes a mechanical contact to incorrectly operate to damage a power equipment connected to the power line. In addition, since the bimetal has a wide bent temperature range, it is difficult to rapidly cut off power and a secular change occurs.

When current of 8 to 12 times greater than rated current flows, since a circuit breaker using mechanical contacts cuts off the current, the cut-off operation actually occurs after the power equipment is damaged.

An earth leakage breaker operates like the circuit breaker and also breaks a circuit after the damage. Accordingly, more precise current management and rapid cut-off are necessary. In fact, as an alternative, there is an electronic circuit for protecting a wire using a method for measuring current with a coil (i.e. current transformer) in order to overcome limitations of the mechanical contacts and bimetal. This is a good improvement but the circuit therefor is complex. Accordingly, a more improved electrical switchgear is desired.

SUMMARY

The present disclosure provides an electrical switchgear capable of removing mechanical contacts and bimetals causing malfunctions of overload relays.

The present disclosure also provides an electrical switchgear having a simple structure and high reliability.

An embodiment of the inventive concept provides an electrical switchgear including: an electro-magnet configured to switch on/off a power line in response to a flow of current for an electro-magnet control to allow power to be supplied to or cut off from a power equipment as a load; a critical temperature device of which an output current value varies when a temperature of a heating wire, which is connected to the power line, exceeds a critical temperature by supply current flowing to the power equipment; and an electro-magnet control unit configured to allow a flow of electro-magnet control current of the electro-magnet to be generated or cut off in response to the output current value of the critical temperature device.

In the inventive concept, in order to heat power lines for supplying power to a power equipment, heating resistor wire having larger resistance is connected to the power lines and current flows through the heating resistor wire to heat it. A temperature of this heat is detected with a device (a critical temperature device) having rapidly changing resistance or current at a specific critical temperature and a silicon controlled rectifier (SCR) and a transistor (or a triac) is controlled with a current difference occurring at the critical temperature.

The SCR and transistor (or triac) cuts off electro-magnet control power used for providing an electro-magnet in a magnetic contactor and switches off a main power line for delivering power to the electrical switchgear. When such a circuit is mounted inside the magnetic contactor, the electrical switchgear may be made small without a separate thermal overload relay.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 1 illustrates an exemplary type of a typical mechanical electrical switchgear;

FIG. 2 is a component configuration diagram of the thermal overload relay of FIG. 1;

DETAILED DESCRIPTION

Figure 3:
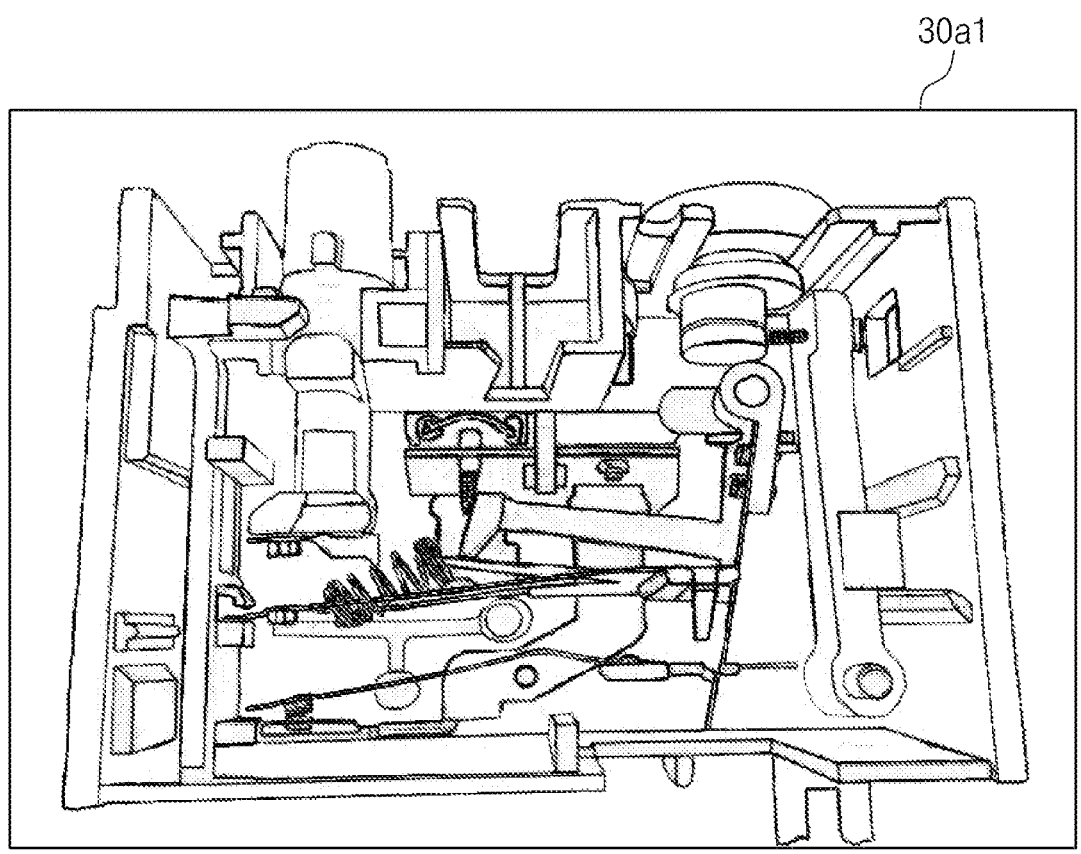
FIG. 3 is a shape diagram of a mechanical contact of the thermal overload relay of FIG. 1.
Figure 4:
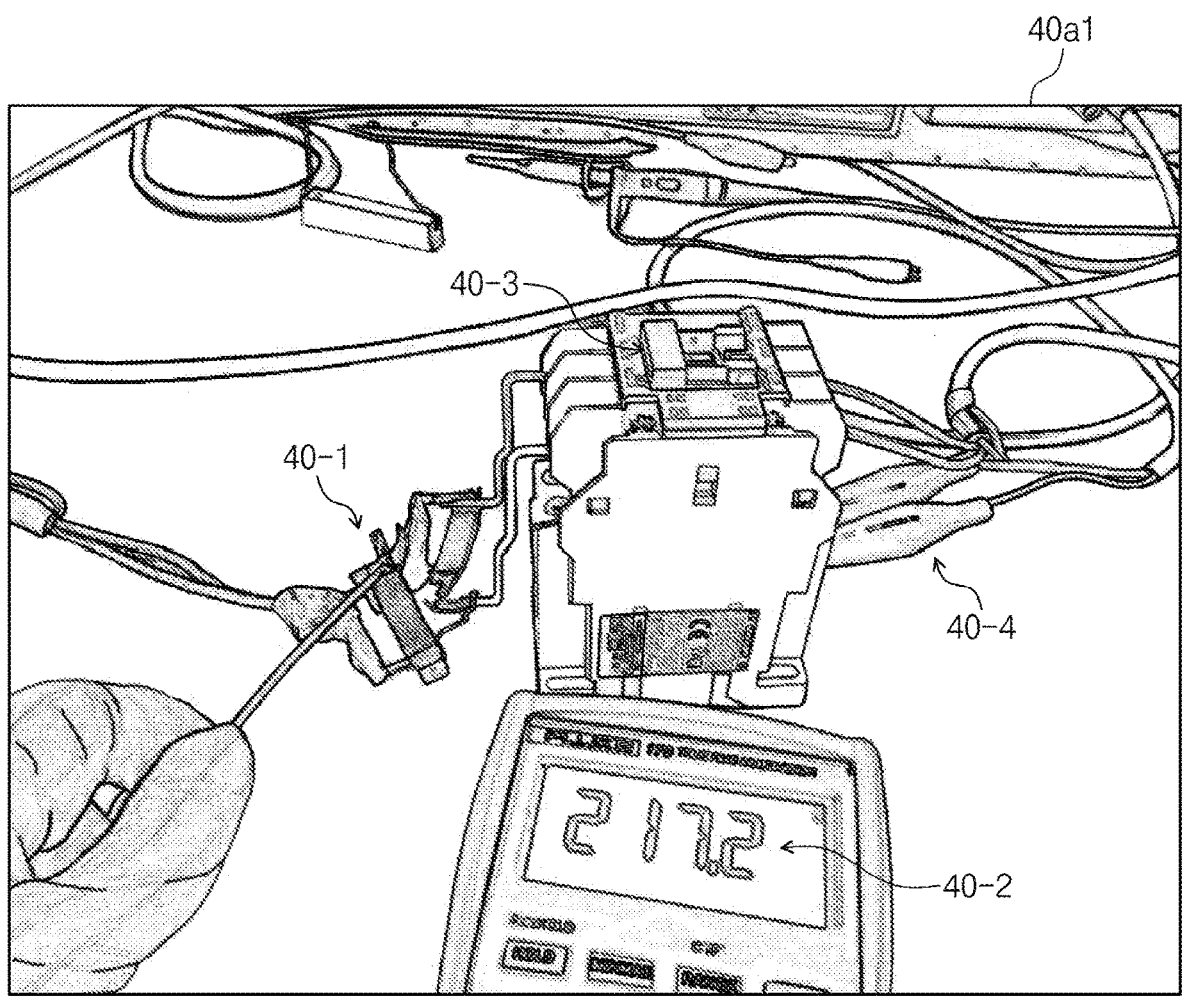
FIG. 4 is a view presented for explaining an ex-post cut-off operation of the thermal overload relay of FIG. 1.
Figure 5A:
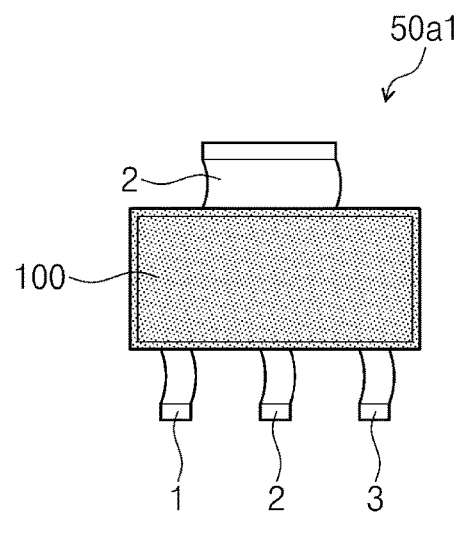
FIG. 5 is a view presented for explaining characteristics of a metal-insulator transition-critical temperature switch (MIT-CTS)
Figure 5B:
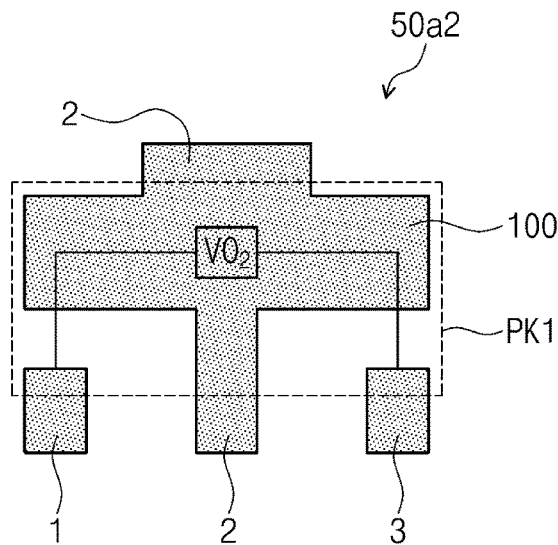
Figure 5C:
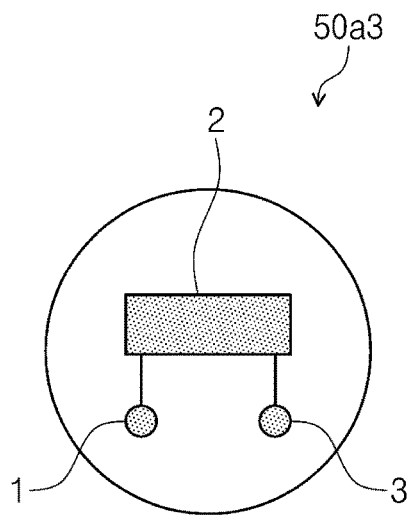
Figure 5D:
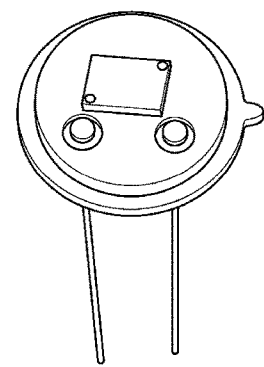
Figure 5E:
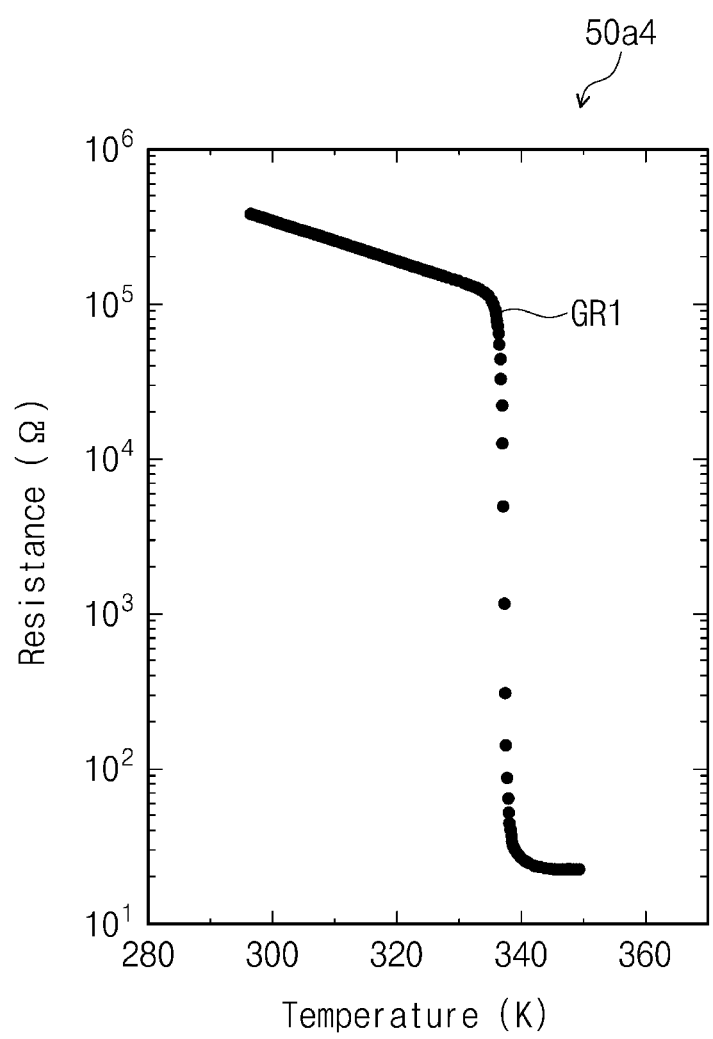

Hereinafter, embodiments of the present invention will be described in detail with reference to the accompanying drawings. The following descriptions will be made focusing on configurations necessary for understanding embodiments of the invention. Therefore, descriptions of other configurations that might obscure the gist of the disclosure will be omitted.

A part, at which two metals having different temperature coefficients are connected, has relative large resistance. When this large resistance is used, heating is relatively high.

In an embodiment of the inventive concept, a critical temperature device has a characteristic that resistance thereof varies from high resistance to low resistance with increasing temperature at a specific temperature to allow large current to suddenly flow. The critical temperature device is called as a metal-insulator-transition critical temperature-switch (MIT-CTS) or a metal-insulator-transition device (MIT device).

FIG. 5 is a view presented for explaining characteristics of a metal-insulator transition-critical temperature switch (MIT-CTS).

A reference numeral 50a1 indicates a shape of an MIT-CTS, which is one kind of a critical temperature device, and reference numeral 50a2 indicates configuration terminals of the MIT-CTS.

A first terminal 1 is connected to a control input stage and functions as an electrically positive (+) or negative (−) terminal. A third terminal 3 is connected to a control output stage and functions as an electrically negative (−) or positive (+) terminal. A second terminal 2 is insulated from the first and third terminals 1 and 3, and functions as a thermal terminal connected to a heat source.

An MIT-CTS is shown with a reference numeral 50a3 as one kind of a critical temperature device capable of measuring a temperature of a power line in a non-contact manner. As shown in a front view and a device photo of the MIT-CTS, terminals of the critical temperature device are the same as terminals shown with the reference numeral 50a2. In this case, heat generated by the wire is delivered to the critical temperature device in an infrared ray type. A point to which the infrared ray is delivered in the non-contact manner corresponds to the second terminal of the reference numeral 50a2.

A reference numeral 50a3 shows a graph GR1 of a temperature vs. resistance of a metal-insulator-transition critical temperature-switch (MIT-CTS). In the graph, a horizontal axis denotes temperature and a vertical axis denotes resistance. It may be seen from the graph that the critical temperature is about 340K (67° C.). As a typical metal-insulator transition material, vanadium oxide is representative, but a material having a higher critical temperature is being developed.

An MIT-CTS device may require a constant voltage circuit as shown in FIGS. 13A to 13D in order to improve reliability thereof.

In addition, characteristics of the MIT-CTS may be realized by using a thermister TM of which resistance exponentially decreases according to a temperature increase, a comparator, and a transistor.

FIGS. 6A to 6E are views presented for explaining a gate control of an SCR.

Figure 6A:
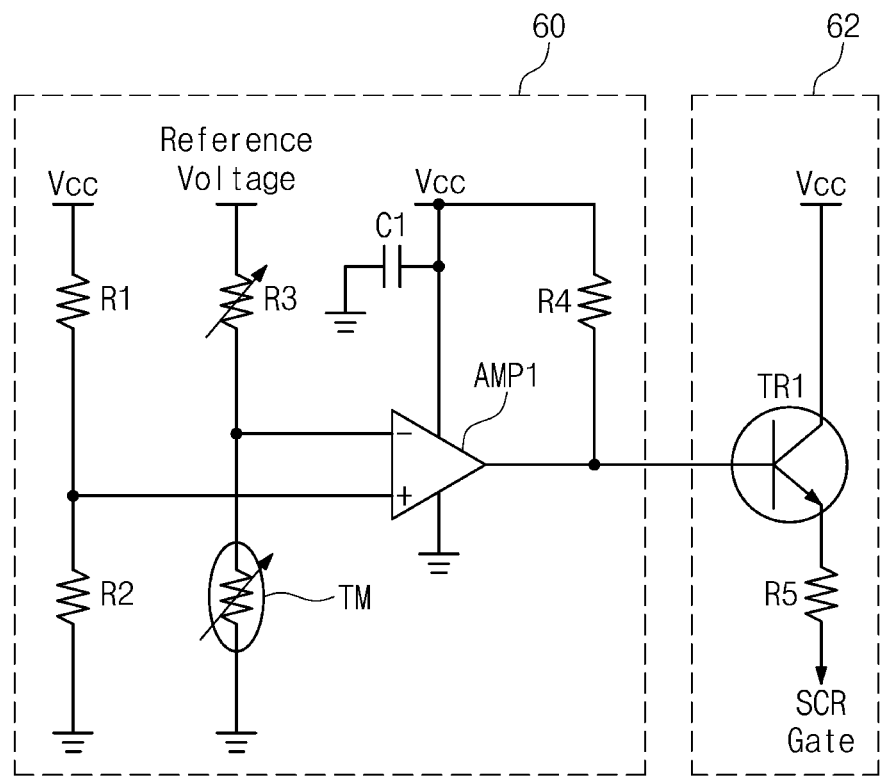
FIGS. 6A to 6E are views presented for explaining a gate control of a silicon controlled rectifier (SCR)

A circuit of FIG. 6A includes a temperature sensing unit 60 and a control transistor 62.

The temperature sensing unit 60 includes a thermister TM, a comparator AMP1, and a voltage setting unit R1 and R2, which have a critical characteristic as shown in FIG. 5 in order to implement functions of the MIT-CTS. A reference voltage is connected to one end of a resistor R3.

When the control transistor 62 is an NPN transistor TR1, an output of the comparator AMP1 is connected to a gate of the NPN transistor TR1. An emitter of the NPN transistor TR1 may be connected to the gate of an SCR through a resistor R5.

Figure 6B:
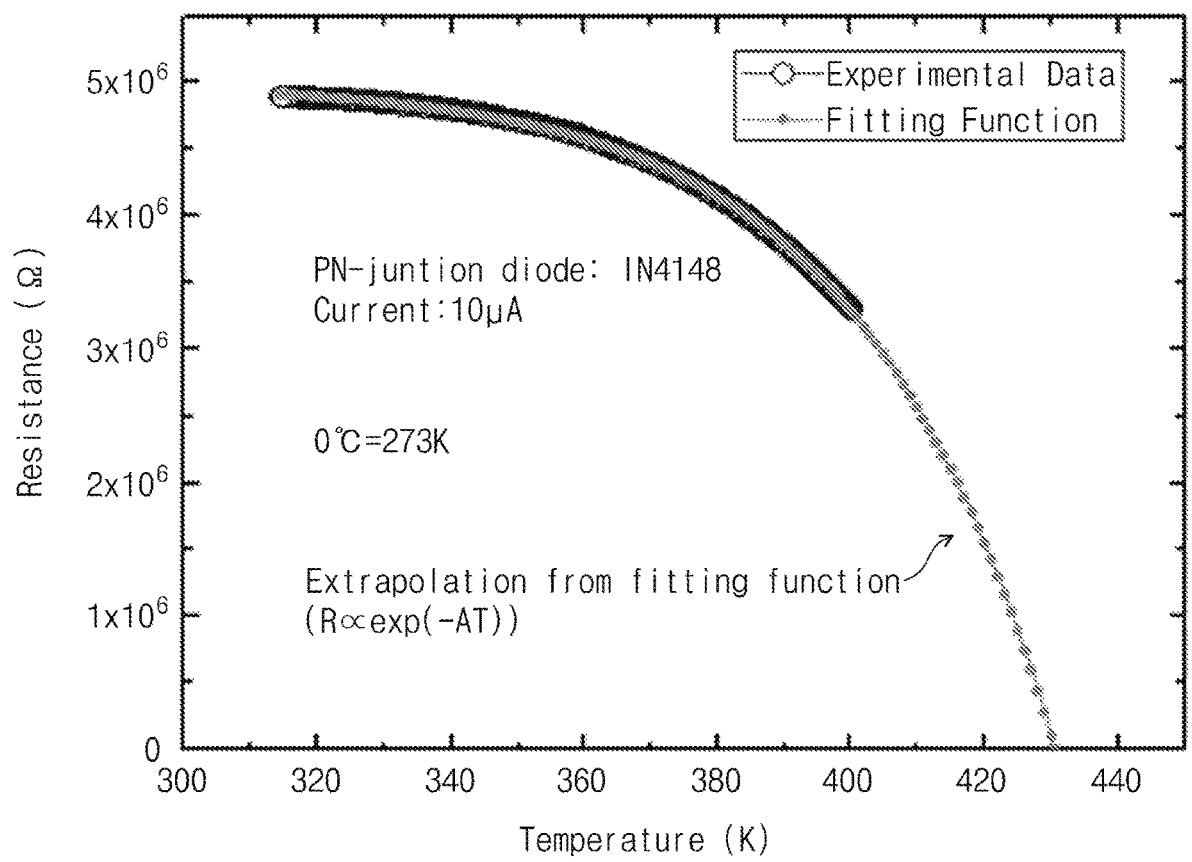

FIG. 6B shows a characteristic graph of temperature vs. resistance of the thermister TM. In the graph, a horizontal axis denotes temperature and a vertical axis denotes resistance. As seen from the graph, the resistance exponentially decreases according to a temperature increase.

The thermister may be provided by using a PN junction diode and a ceramic material. In addition, the circuit of FIG. 6A, which includes a thermister, a comparator, and a transistor TR1, may be implemented with a one-chip commercial critical temperature IC device in order to output an MIT-CTS function. The PN junction diode has an MIT characteristic that large current flows when a PN junction band gap disappears, and accordingly may be used as a critical temperature device.

Figure 6C:
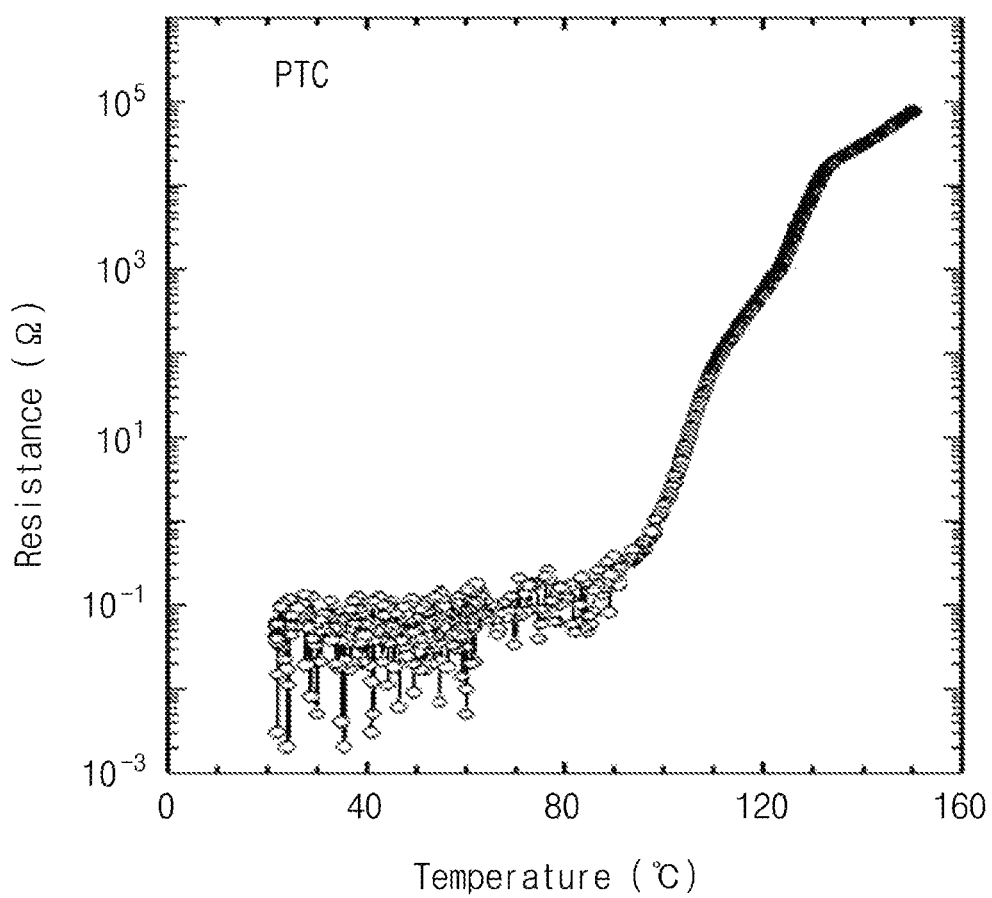

FIG. 6C shows a characteristic graph of temperature vs. resistance of a positive temperature coefficient (PTC) device. In the graph, a horizontal axis denotes temperature and a vertical axis denotes resistance. As may be seen from the graph, the resistance rapidly increases according to a temperature increase from 100° C. Substantially, current may be cut off from a temperature of 130° C. and resistance of 1 KΩ. The PTC device has a characteristic that resistance thereof is very small at a room temperature and suddenly increases at about 100° C. or higher. However, an actual current cut-off effect appears from a temperature of 130° C. or higher at which the resistance largely increases.

Figure 6D:
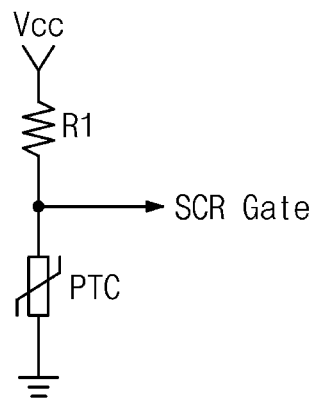

FIG. 6D shows a simplified circuit for controlling an SCR gate using a PTC device. A resistor R1 and a PTC device are sequentially connected between a power supply voltage and an earth voltage, and a gate control voltage may be provided through the other end of the resistor R1.

Figure 6E:
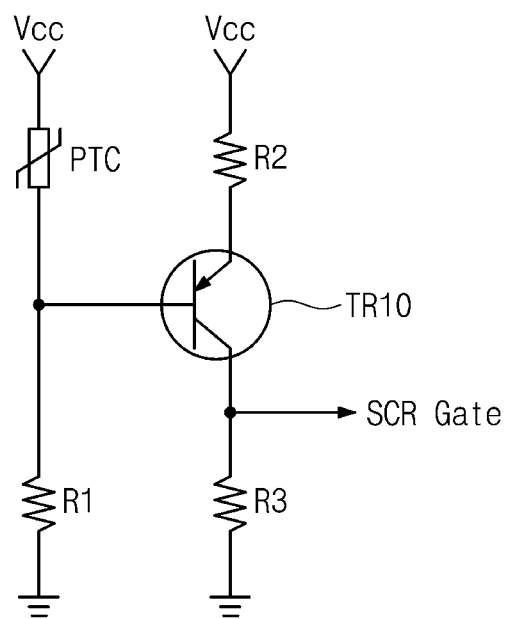

FIG. 6E shows another simplified circuit for controlling the SCR gate using the PTC device.

A PTC device and a resistor R1 are sequentially connected between a power supply voltage and an earth voltage, and a gate control voltage may be supplied through a collector of a transistor TR10 connected between resistors R2 and R3.

As shown in FIGS. 6D and 6E, the characteristic of the PTC device is reverse to that of the MIT-CTS. However, a circuit may be configured to output the characteristic of the MIT-CTS by using the PTC device, even when a critical temperature of the PTC device is high.

As described above, circuits (i.e. temperature sensing unit+transistor) outputting an MIT-CTS function by using an MIT-CTS or thermistor will be commonly called critical temperature switch device or critical temperature device.

The critical temperature device functionally has three terminals, and as described before, has a thermal terminal 2 that is electrically insulated.

Although the critical temperature device has two terminals in appearance, when responding to heat, it may be said that a body part of the device functions as a thermal terminal.

When three-phase current is applied or power lines are present in plural numbers, critical temperature devices may be respectively connected in parallel to heat sources.

Figure 7:
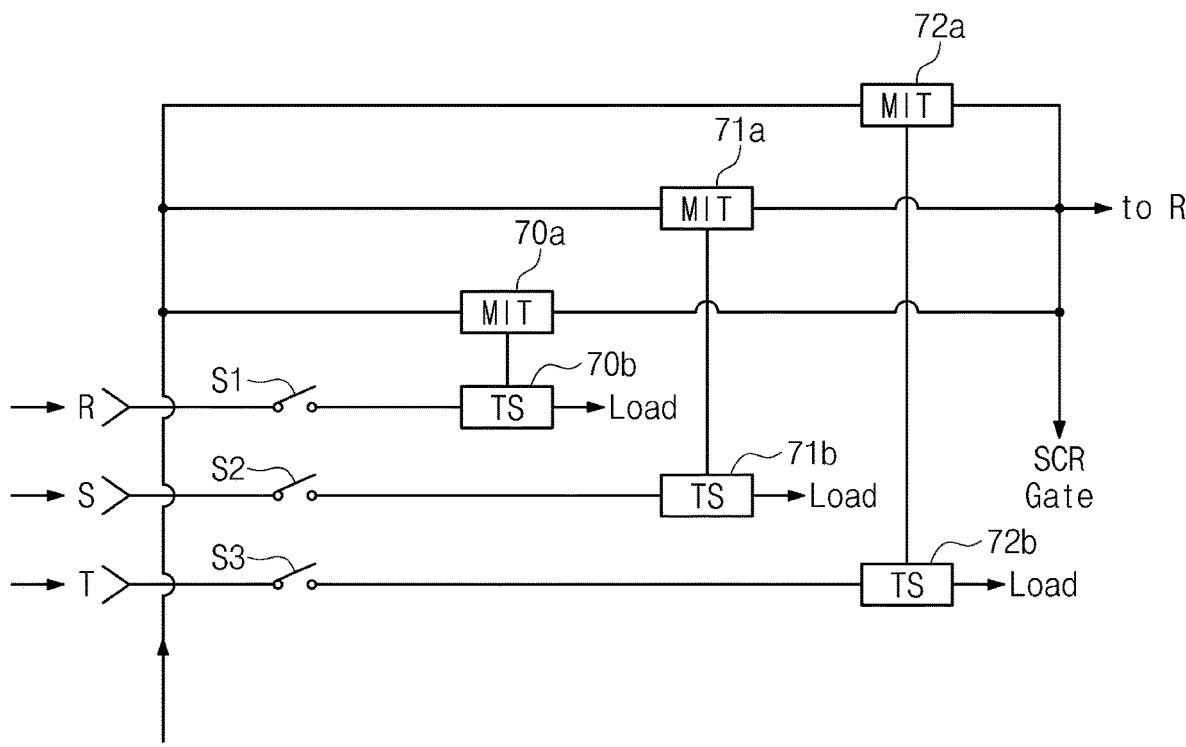
FIG. 7 is a circuit configuration diagram to which an MIT-CTS is applied in parallel in a case of three-phase current inflow.

FIG. 7 is a circuit configuration diagram to which an MIT-CTS is applied in parallel in a case of three-phase current inflow.

Referring FIG. 7, three phase power lines such as R, S, and T have heat sources 70b, 71b, and 72b, and MIT devices 70a, 71a, and 72a are respectively connected to the heat sources 70b, 71b, and 72b. When heat by the heat source is detected to reach a critical temperature by the MIT device, which is a critical temperature device, a control voltage at the output terminal of the critical temperature device is generated at the gate of the SCR to turn on the SCR. Accordingly, an electro-magnet becomes an inactivated state from an activated state, and switches S1, S2, and S3 are switched to an open state. Accordingly, supplying power to a power equipment is cut off, which is persisted by being repaired by person. This means the absence of the automatic recovery. The activated state means to have an electro-magnet function, and the inactivated state means that current does not flow through a coil and the electro-magnet function is lost.

As described above, since the critical temperature device has a critical characteristic with a resistance change from high resistance to low resistance with increasing temperature at the critical temperature, a current value at the critical temperature directly becomes a cut-off current. In addition, the critical temperature device is made to have a chip shape of a semiconductor device, a frame thereof may be made from copper, brass (a kind of copper alloy), copper alloy, or ferroalloy, and the frame itself may function as a heating wire.

Figure 8:
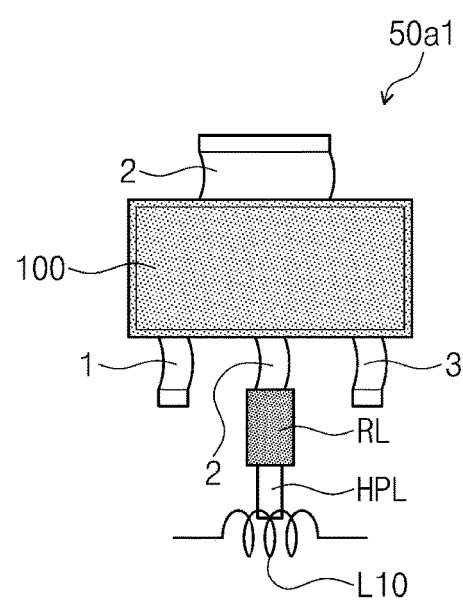
FIG. 8 is a view illustrating a structure in which a resistance element is coupled to a front stage of the MIT-CTS.

FIG. 8 is a view illustrating a structure in which a resistance element is coupled to a front stage of the MIT-CTS.

Referring to FIG. 8, a resistance device RL functioning as a thermal insulation resistor is connected between a heat source such as a nichrome wire L10 and a thermal terminal 2. When the heat is relatively large, the resistance device RL partially cuts off heat delivered to the thermal terminal 2 and protects the critical temperature device.

Figure 9A:
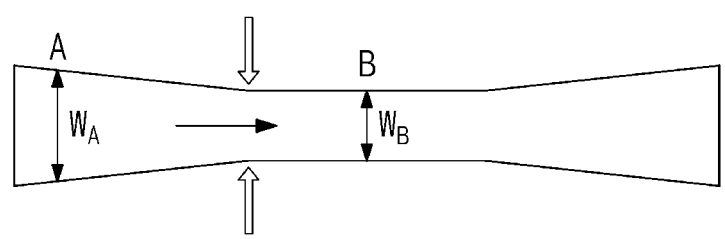
FIGS. 9A and 9B are views presented for explaining a resistance increase according to a wire width.
Figure 9B:
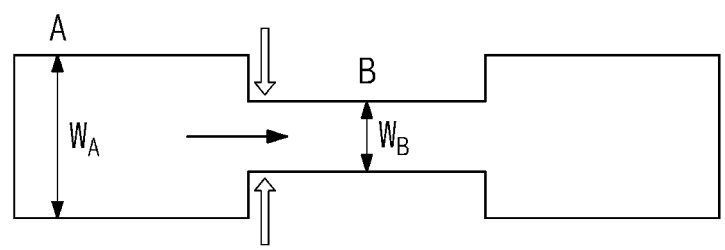

FIGS. 9A and 9B are views presented for explaining a resistance increase according to a wire width.

Although a board die on which a critical temperature device chip is mounted is made of iron, copper, or copper alloy, since the exterior of the board die is plated, a resistivity thereof is relatively small and a hardness thereof is relatively high. Therefore, large current may be flowed through a thermal terminal of the critical temperature device. However, the resistivity of the critical temperature device is larger than that of copper used as a wire. Thus, when the current flows, larger heating than heat in the power lines occurs in the critical temperature device.

In FIG. 9A, when current flows from a region A to a region B along an arrow, since the wire width is gradually decreased from WA to WB, heat at the region B is greater than that at the region A.

In FIG. 9B, when current flows from a region A to a region B along an arrow, since the wire width is rapidly decreased from WA to WB, heat at the region B is also greater than that at the region A.

In the end, when the wire width is decreased, since resistance increases at that decreased wire part, heat at the part where the width is decreased is greater than that at the part where the width is not decreased.

FIGS. 10A to 10D are views presented for explaining heating according to a connection type of the MIT-CTS.

Figure 10A:
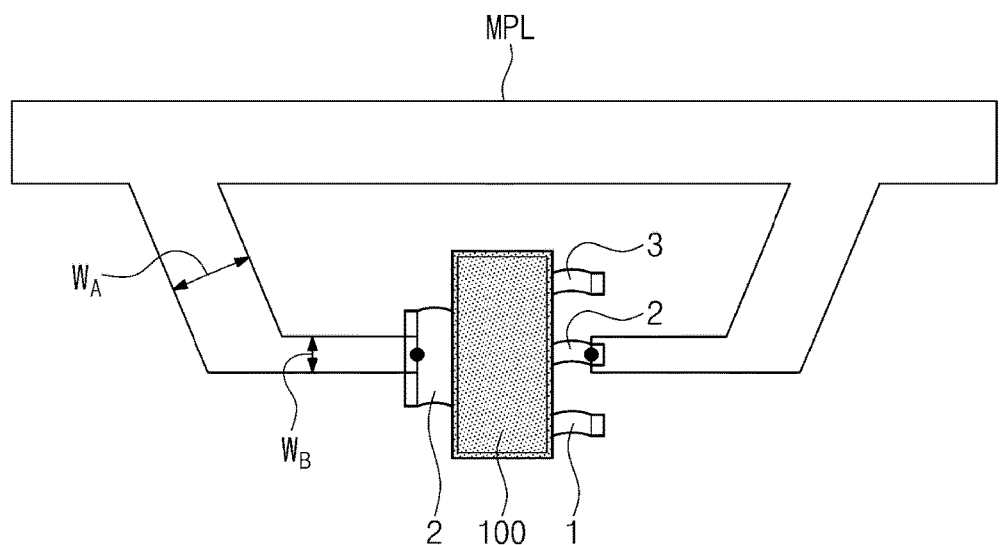
FIGS. 10A to 10D are views presented for explaining heating according to a connection type of the MIT-CTS.

FIG. 10A illustrates heating wires appearing on the basis of the principle shown in FIGS. 9A and 9B, when the critical temperature device 100 is connected between branch wires furcated from a main power line MPL. The part where the wire width is decreased from WA to WB is relatively more heated and functions as the heating wire. The thermal terminal 2 of the critical temperature device 100 is connected between the branch wires.

Figure 10B:
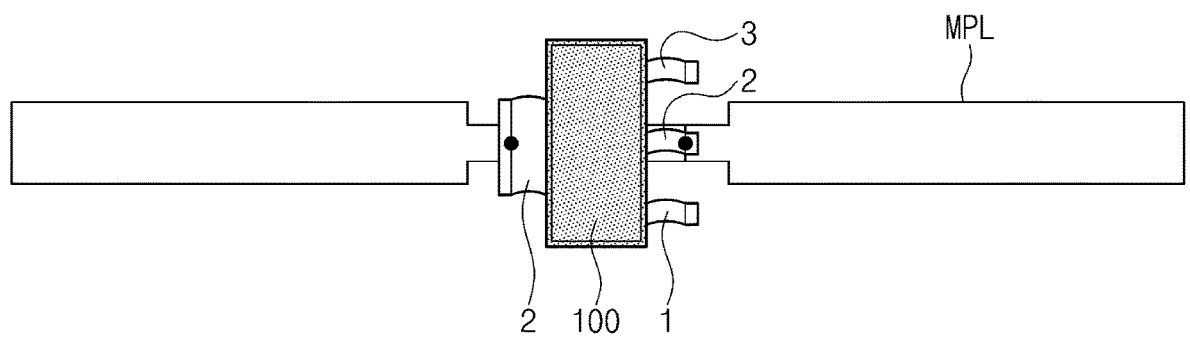

FIG. 10B illustrates a structure in which the critical temperature device 100 is installed on the main power line MPL on the basis of the principle shown in FIGS. 9A and 9B. In this case, in order to improve the heating effect, the thermal terminal 2 of the critical temperature device 100 is connected on the power line.

Figure 10C:
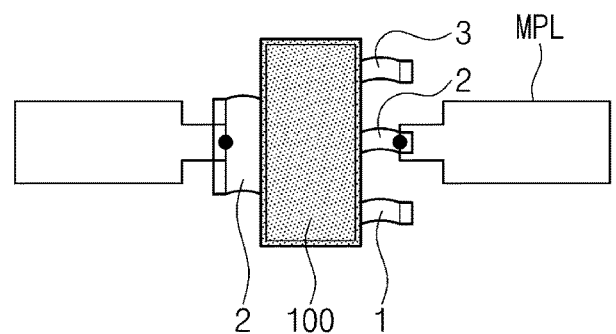

FIG. 10C illustrates a structure in which the critical temperature device 100 is connected between the main power line MPL. In this case, the critical temperature device 100 also serves a role of a power line. In this case, in order to improve the heating effect, the thermal terminal 2 of the critical temperature device 100 is connected between the power lines.

Figure 10D:
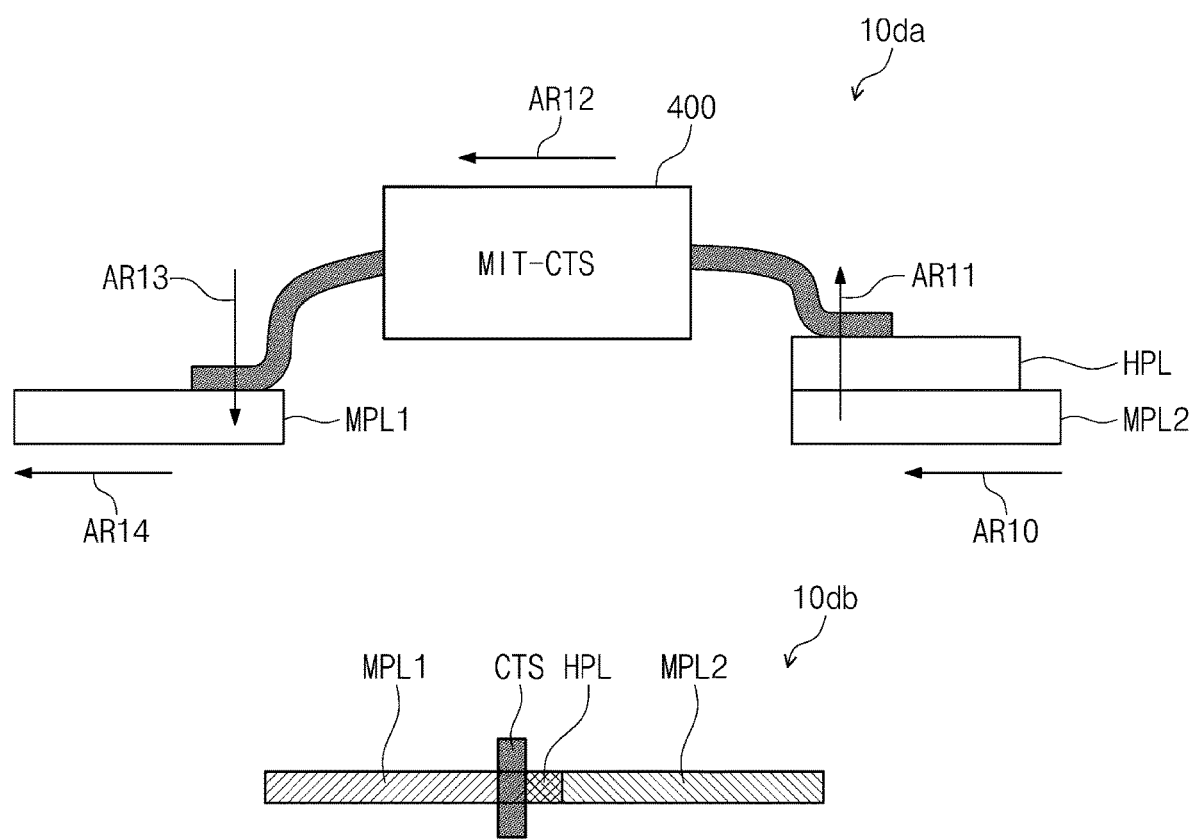

FIG. 10D illustrates a type of a critical temperature switch CTS in which a critical temperature switch 400 of which a frame is made of a material of a main power line and a wire having a material different from that of the main power line are serially connected. Here, the critical temperature switch 400 and the critical temperature switch CTS function as the critical temperature device 100.

In a reference numeral 10da, HPL indicates a heating wire and in a reference numeral 10db, HPL indicates a heating wire.

A part at which the main power line MPL2 and the critical temperature switch 400 are connected is a part at which two metals having different temperature coefficients are connected. Accordingly, due to relatively large resistance at this part, higher heat is generated than that at the main power line and the temperature becomes higher. In the end, the heating wire HPL may be effectively designed by using this phenomenon.

It should be noted that the main power line in the embodiment means a power line for delivering power and is only used for distinguishing it from a heating wire.

FIG. 20 to be described later shows various examples for using a copper wire, a brass wire, or a ferroalloy wire as the heating wire.

Figure 11:
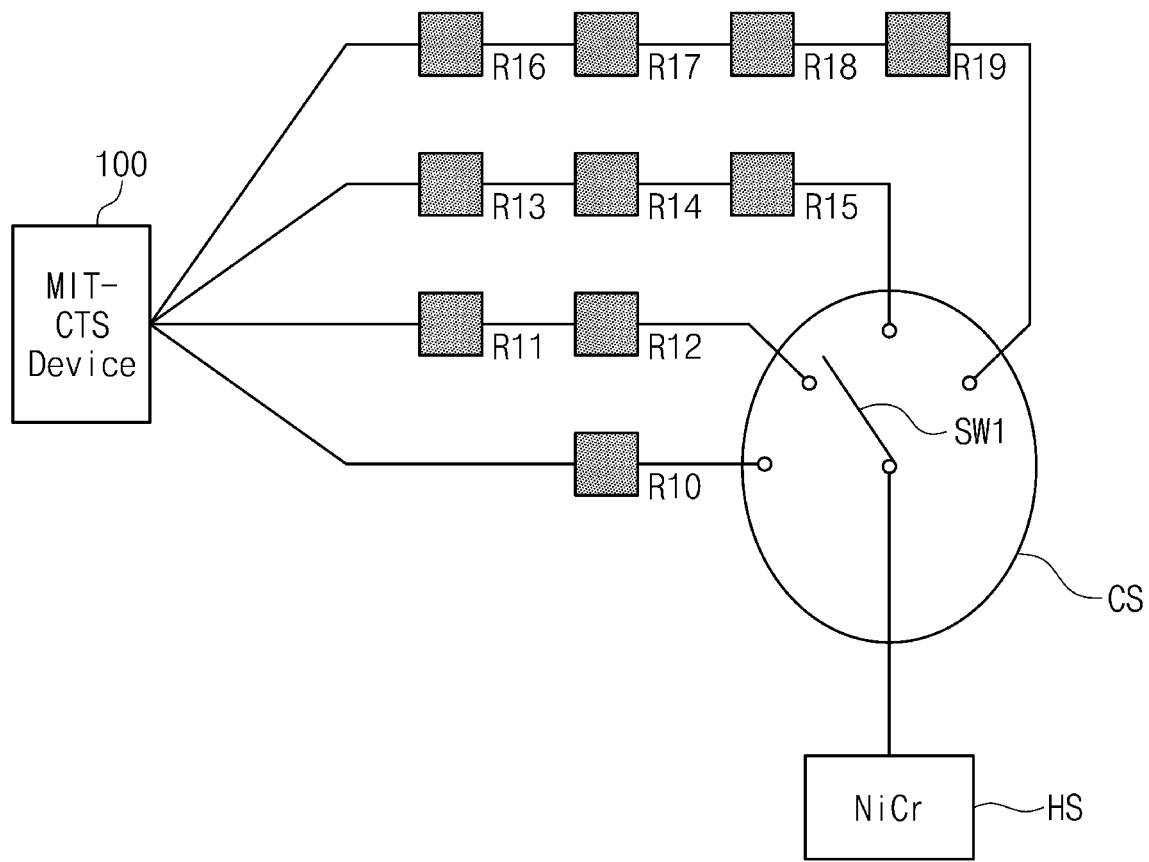
FIG. 11 is a connection configuration diagram of a thermal insulation resistance division switch in which resistors having a uniform resistance value are arrayed for an MIT-CTS control.
Figure 12:
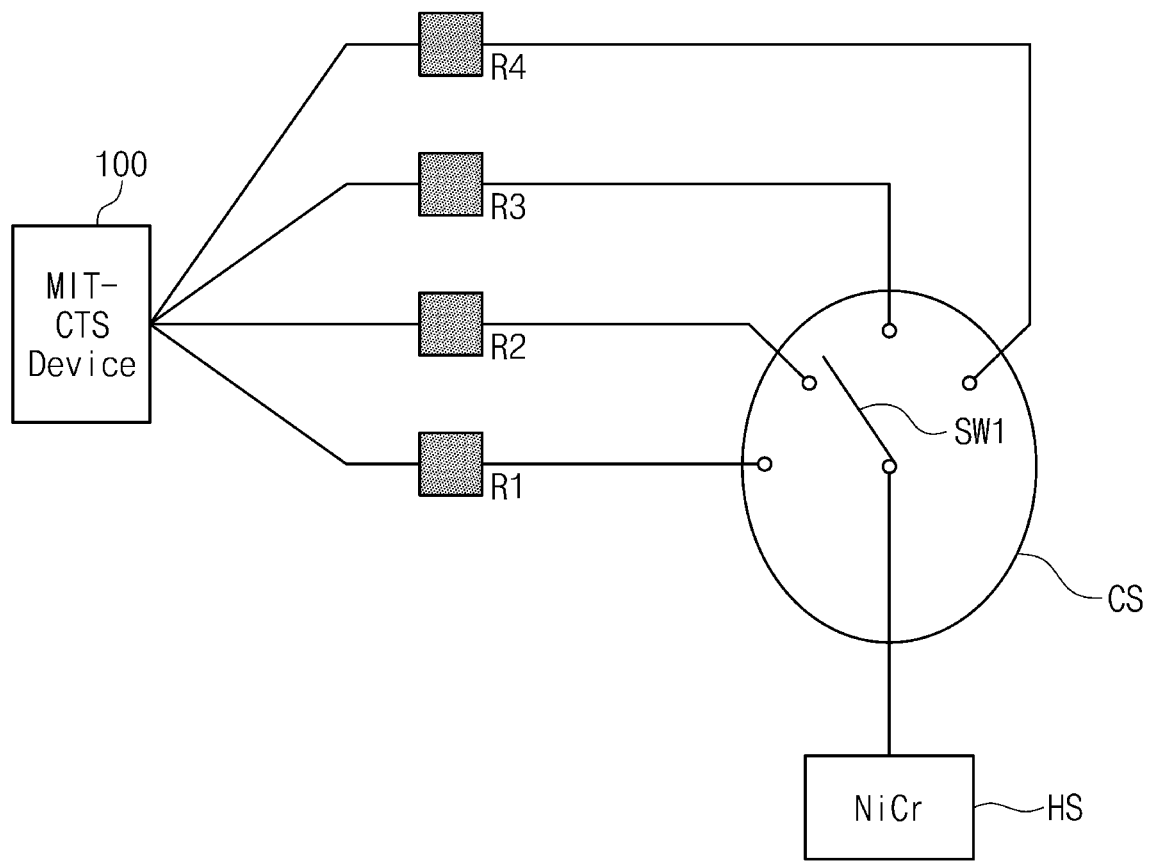
FIG. 12 is a connection configuration diagram of a thermal insulation resistance division switch in which resistors having different resistance values are arrayed for an MIT-CTS control.

FIG. 11 is a connection configuration diagram of a thermal insulation resistance division switch in which resistors having a uniform resistance value are arrayed for a current control. In addition, FIG. 12 is a connection configuration diagram of a thermal insulation resistance division switch in which resistors having different resistance values are arrayed for a current control. FIGS. 13A to 13D are views showing various examples of a constant voltage supply circuit.

Figure 14:
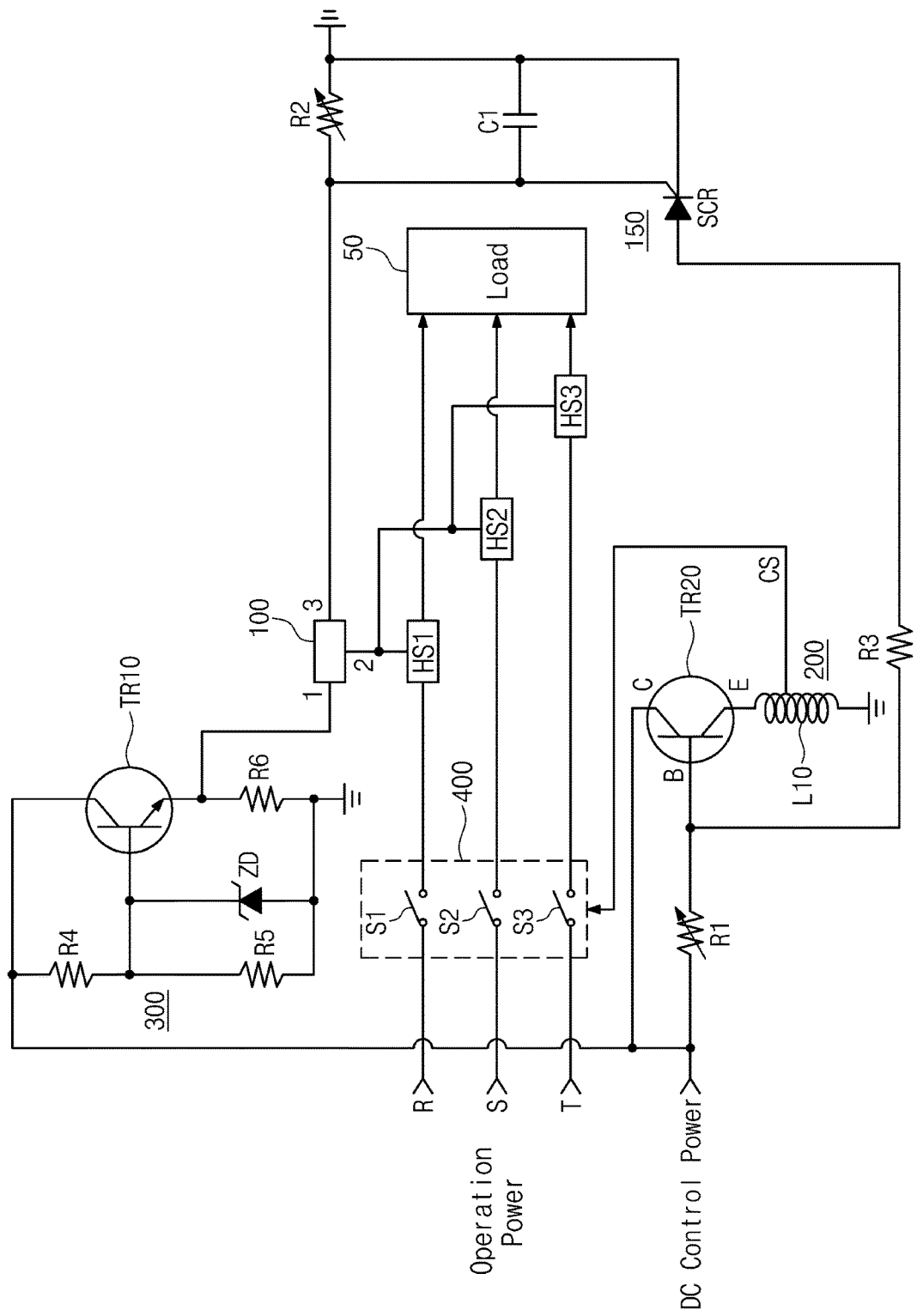
FIG. 14 is a circuit diagram of an electrical switchgear according to an embodiment of the inventive concept.

In addition, FIG. 14 is a circuit diagram of an electrical switchgear according to an embodiment of the inventive concept.

A circuit in FIG. 14 is firstly described prior to FIGS. 11 to 13.

FIG. 14 illustrates a circuit configuration including an electro-magnet 200, a critical temperature device 100, and an electro-magnet control unit 150.

The electro-magnet 200 switches power, which is applied through the power lines R, S, and T in response to a flow of control current through a coil L10, to a power equipment connected to a load side.

An output current value of the critical temperature device 100 becomes changed when a heating temperature due to supplying current flowing from the power line to the power equipment exceeds a critical temperature.

The electro-magnet control unit 150 includes an electro-magnet driving switch TR20 (i.e. electro-magnet current supplying switch) and an electro-magnet current cutting off switch (SCR). The electro-magnet control unit 150 allows a flow of the control current of the electro-magnet for the electro-magnet 200 to be generated or cut off in response to an output current value of the critical temperature device 100.

The electro-magnet driving switch TR20 may be included in or separately provided to the electro-magnet 200. The electro-magnet driving switch TR20 plays a role in allowing the control current to be flowed to or cut off from the electro-magnet 200 in response to a control voltage applied to a base thereof. The electro-magnet driving switch TR20 is configured with bipolar transistors, but is not limited thereto, and may be realized with a triac, an SCR, or a relay. In addition, a resistor R1 connected to the electro-magnet current cutting off switch SCR may have a value of 30Ω and R3 has a value of 50Ω.

A base of the electro-magnet driving switch TR20 is connected to an anode of the SCR through the resistor R3 such that the switches S1, S2, and S3 of the magnetic contactor 400 are switched by an inactivation or activation operation of the electro-magnet 200. Here, the electro-magnet current cutting off switch SCR is used for continuing a cut-off state.

When a heating temperature is sensed to be the critical temperature by a heating sensing operation of the critical temperature device 100, a voltage higher than a voltage applied at the critical temperature is applied to the gate of the SCR. Accordingly, the SCR is turned on and current, which has flowed into the base of the electro-magnet driving switch TR20, flows from the anode to the cathode of the SCR. Accordingly, since a current path is established toward an earth, a base voltage of the electro-magnet driving switch TR20 drops and finally the electro-magnet driving switch TR20 is turned off. Accordingly, current, having flowed through the coil L10 of the electro-magnet 200, disappears and an electro-magnet function is lost. Accordingly, the switches S1, S2, and S3 closed in a previous state are opened to cut off supplying power.

A resistor R2 in FIG. 14 is an element for smoothing a turn-on operation of the electro-magnet current cutting off switch SCR. When the resistance value of the resistor R2 is too small, there is a case where current, which has flowed through the critical temperature device 100 at the time of turn-on, flows out to the earth through the resistor R2 and the SCR does not operate. Accordingly, it is necessary to set the resistance value of the resistor R2 to a proper value. The resistance value of the resistor R2 in the embodiment may be set to 5 KΩ. The resistor R2 may be realized with a PN junction diode for environmental temperature correction. The capacitor C1 may be installed to prevent malfunction due to an impulse noise signal at the time of power input. In other words, a ceramic capacitor of 220 pF may be used for filtering or a signal delay.

For delaying a setting time, the SCR of FIG. 14 may be replaced with a transistor. In addition, the electro-magnet driving switch TR20 may be controlled by a programmable logic controller (PLC) without the SCR.

On the other hand, it may not be easy to arbitrarily adjust the critical temperature of the critical temperature device 100. When the temperature of a heat source HS is too high, a resistor for thermal cutoff is provided in front of a thermal terminal of the critical temperature device 100 to allow the temperature to be adjusted.

In this case, as FIG. 11, several thermal cutoff resistors may be also used in serial. In addition, channels having one thermal cutoff resistor, two thermal cutoff resistors, three cutoff resistors, and four thermal cutoff resistors, etc., may be arrayed. Furthermore, one of the channels is selected by using a changeover switch and a current amount may be adjusted according to a resistance value of the selected channel FIG. 11 illustrates a connection configuration of thermal insulation resistance division switch in which resistors having constant values are arrayed for a current control.

For example, when the resistance values of the thermal cutoff resistors R10 to R19 are the same (e.g. 1Ω) and a switch SW1 of the changeover switch CS is selected for a first channel R10, the thermal cutoff resistance is set to a smallest value. On the other hand, when the switch SW1 of the changeover switch CS is selected for a fourth channel R16 to R19, the thermal cutoff resistance is set to a largest value.

On the other hand, as illustrated in FIG. 12, thermal cutoff resistors having different resistance values are connected and critical current may be adjusted through channel selection of the changeover switch CS. FIG. 12 illustrates a connection configuration of a thermal insulation resistance switch in which resistors having different resistance values are arrayed for a current control.

A circuit of FIG. 14 may include a constant voltage circuit 300 for applying a constant voltage to a first terminal 1 of the critical temperature device 100.

The constant voltage circuit 300 may include a voltage follower structure using resistors R4 to R6, an NPN transistor TR10, and a Zener diode ZD.

Figure 13A:
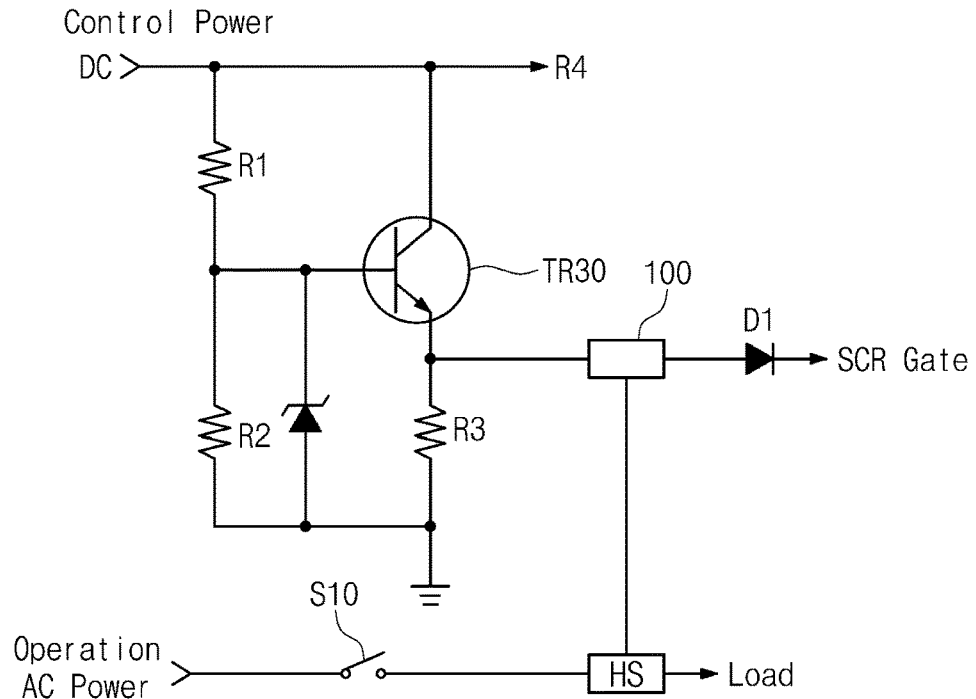
FIGS. 13A to 13D are views showing various examples of a constant voltage supply circuit.

In addition, the constant voltage circuit 300 may be similarly configured to that of FIG. 13A.

Figure 13B:
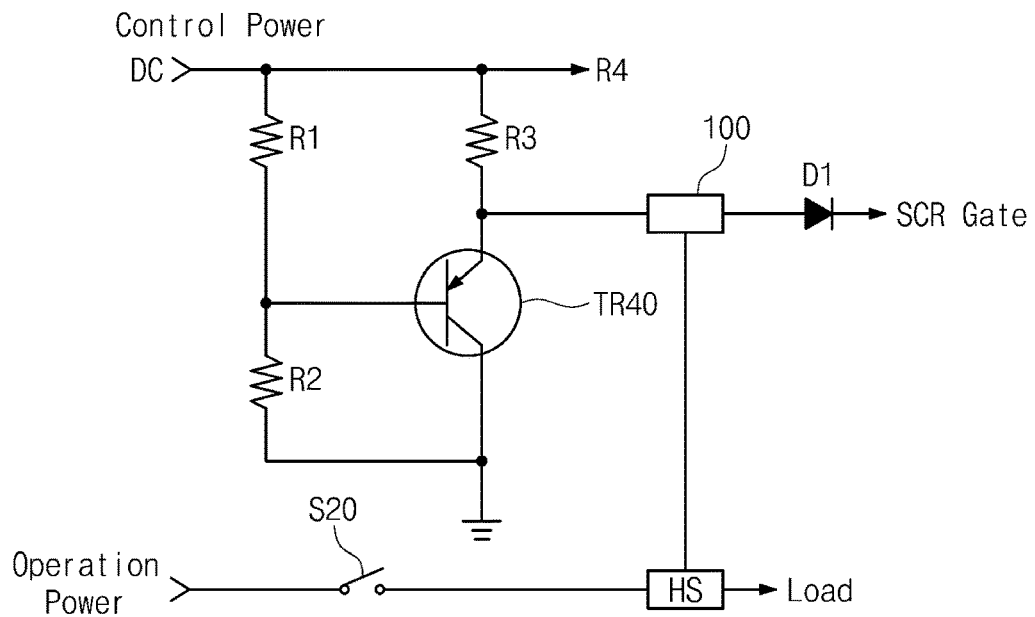
Figure 13C:
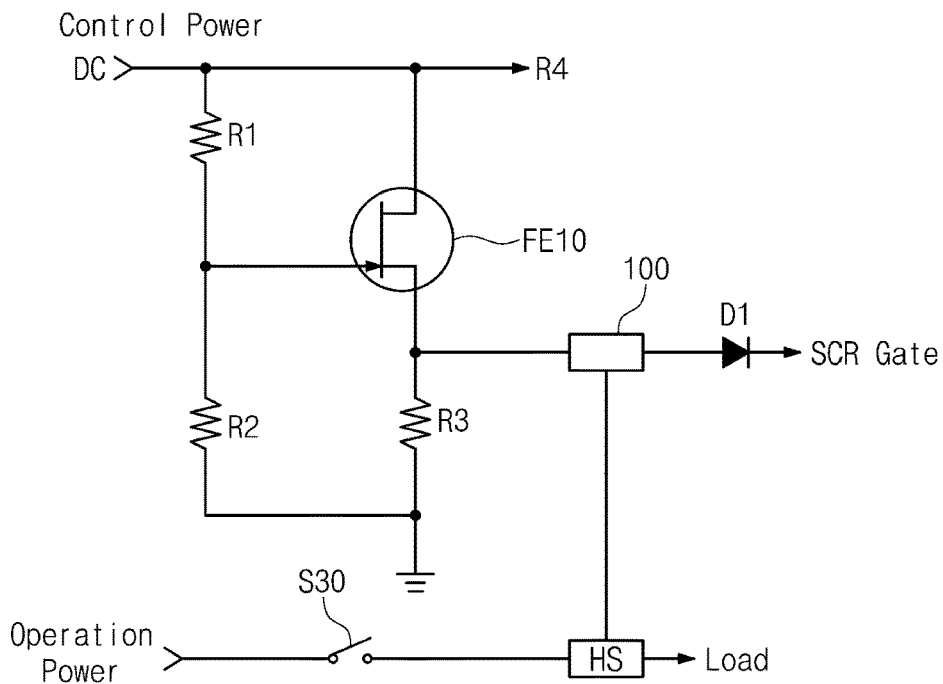
Figure 13D:
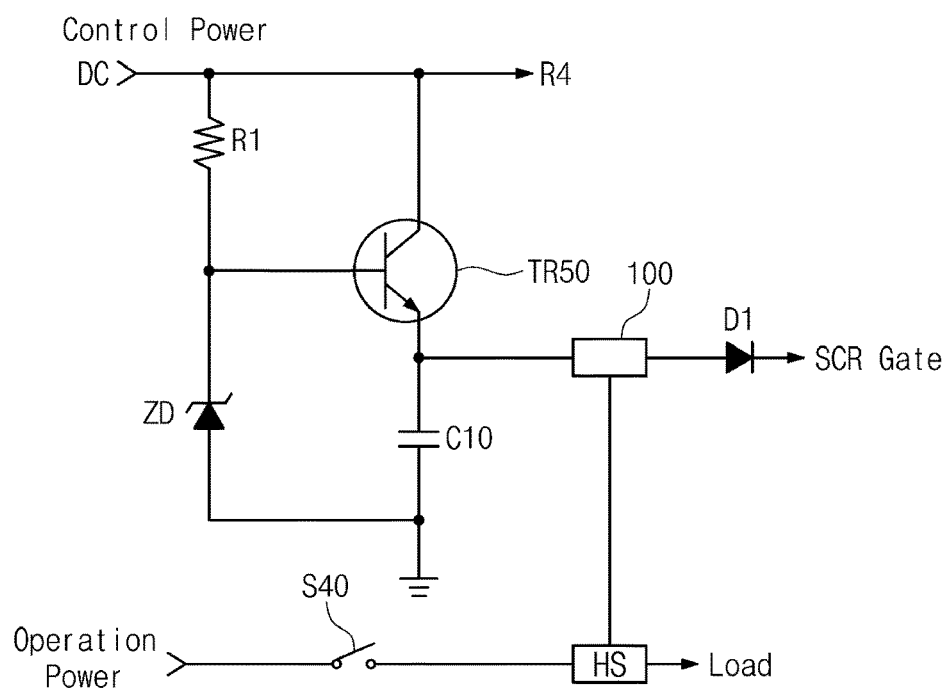

Furthermore, the constant voltage circuit 300 may be realized to a voltage follower structure using resistors R1 to R3 and a PNP transistor TR40 similarly to that of FIG. 13B, and may include a voltage follower structure using resistors R1 to R3 and an FET transistor FE10 like FIG. 13C.

In addition, the constant voltage circuit 300 may include a voltage follower structure using a resistors R1, an NPN transistor TR50, a capacitor C10, and a Zener diode ZD.

Figure 16:
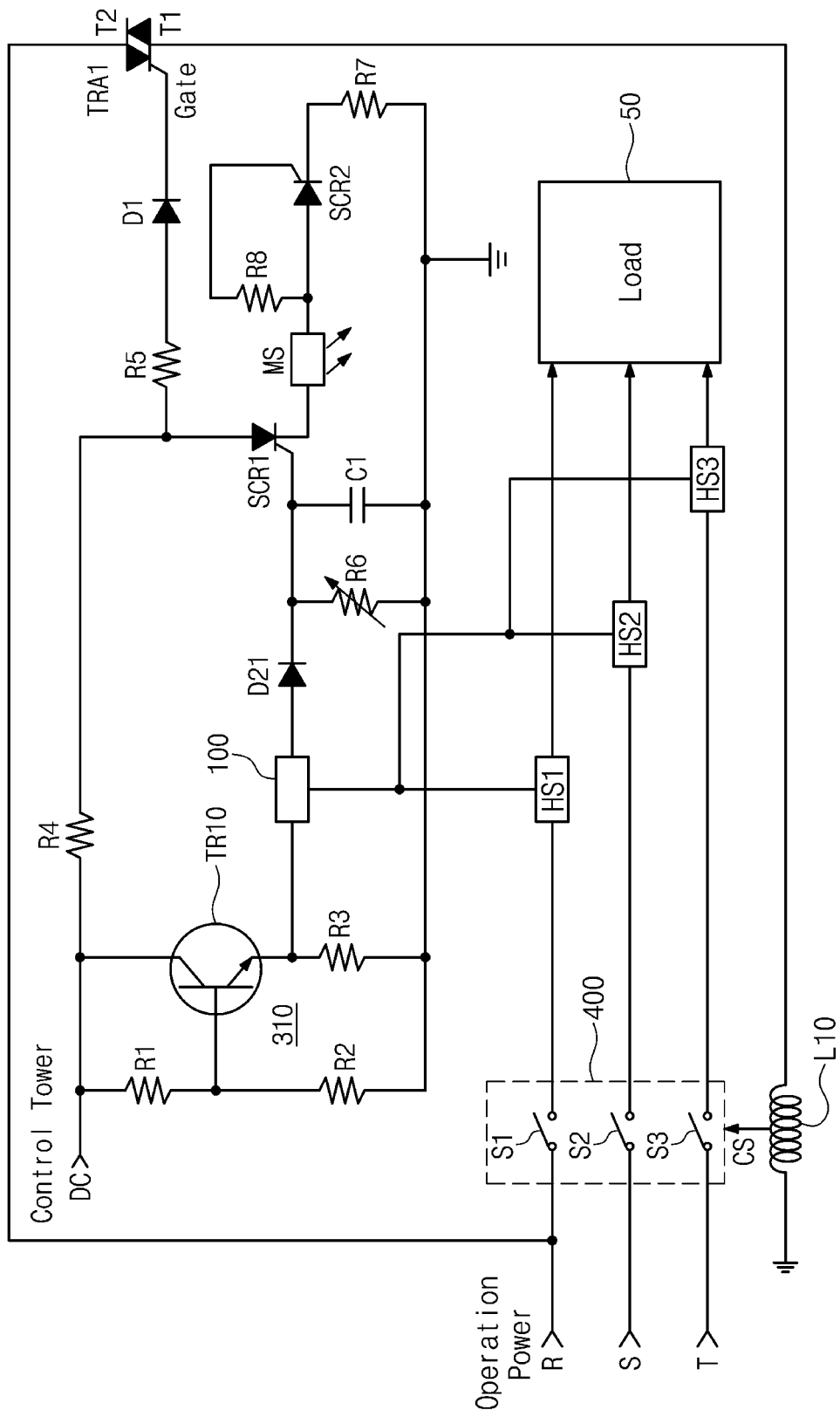
FIG. 16 is a circuit diagram illustrating an electrical switchgear according to another embodiment of the inventive concept.

Although FIG. 14 illustrates that the electro-magnet is controlled with a DC voltage, the embodiment of the inventive concept may be applied regardless of whether the electro-magnet is controlled with DC power or AC power. In other words, for the case of the fact that a voltage for controlling the electro-magnet is AC 110V or 220V, there is a difference only in that resistance of the electro-magnet is larger than that of a DC-type electro-magnet. In the end, when the DC control is changed to the AC control, an extension circuit as illustrated in FIG. 16 may be configured on the basis of the circuit of FIG. 14.

Figure 15:
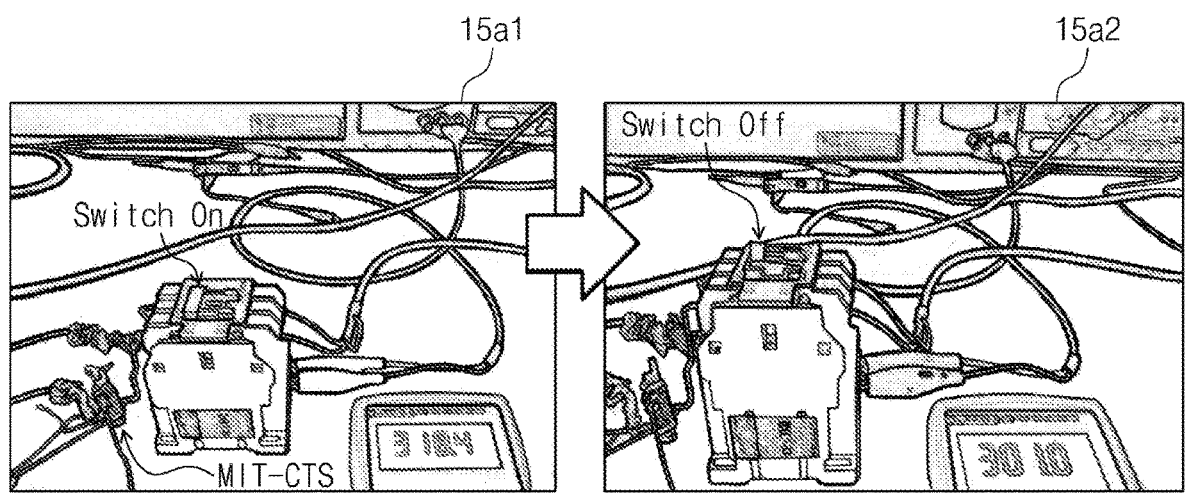
FIG. 15 is a view presented for explaining an operation of the circuit of FIG. 14.

FIG. 15 is a view presented for explaining an operation of the circuit of FIG. 14.

In an experiment shown in FIGS. 15A1 and 15A2, power of 10 A current and 220V AC voltage (operation power for supplying to a power equipment) was used and, for electro-magnet control power, a magnetic contactor MC having a specification of 24V DC voltage and 0.1 A current was used. A nichrome wire having the thickness of 1 mm was connected to an operation power line for supplying to a power equipment. In addition, for an experiment, a radiator of 2500 W was used as the power equipment. The MIT-CTS of FIG. 6A showing a graph characteristic as illustrated in FIG. 5 was connected to the nichrome wire, which is a heat source, as shown in FIGS. 15A1 and 15A2, and then the entire circuit is connected to match with the circuit of FIG. 14.

In the experiment, radiator power of 10 A current and 220V voltage and electro-magnet control power of 0.09 A current and 8.1 V voltage were applied. As a result, the electro-magnet was operated to turn on the radiator and a temperature of the nichrome wire was raised. An MIT device operated at a critical temperature (i.e. a state where high resistance is reduced to low resistance, see FIGS. 15A1 and 15A2) to control the SCR and a transistor for controlling the electro-magnet, and short-circuited the magnetic contactor by turning off the electro-magnet to cut off a system. The current flowing to the SCR in a state where the SCR was turned on was about 150 μA to about 200 μA. In repeated experiments, any abnormality was not found from the system. A reference numeral 15a1 shows a state where switches in the magnetic contactor are closed to supply power to a load, and a reference numeral 15a2 shows a state where the switches in the magnetic contactor are opened to cut off power delivered to the load after a critical operation is performed.

In addition, a magnetic contactor, which operates at AC 100V voltage and 0.1 A current for an electro-magnet control, is used for the experiment. When DC 50 V voltage and 0.5 A current is applied to the magnetic contactor, it is confirmed that a coil part in the magnetic contactor is magnetized into an electro-magnet to perform a contact operation of an AC contactor. Accordingly, since the circuit of FIG. 14 operates with either a DC contactor or an AC contactor, it may be used as an electrical switchgear.

FIG. 16 is a circuit diagram illustrating an electrical switchgear according to another embodiment of the inventive concept.

FIG. 16 illustrates that a triac TRA1 is used as an electro-magnetic driving switch for controlling an electro-magnet with AC current. Accordingly, an electro-magnet of the magnetic contactor for an AC control is controlled in an activated state or an inactivated state.

The electrical switchgear of FIG. 16 may also be applied to an earth leakage breaker and a circuit breaker including a function for overcurrent protection. In this case, a power line may be forcibly connected by using a manual seesaw switch for connecting the power line. In such a state, at the time of activating the electro-magnet, an operation part of the manual switch is pulled with an attractive force to open the power line and the AC power is cut off.

On the other hand, it is also possible to allow power to be supplied by the attraction power of the electro-magnet and the power to be cut off by an inactivation control for the electro-magnet.

Figure 19:
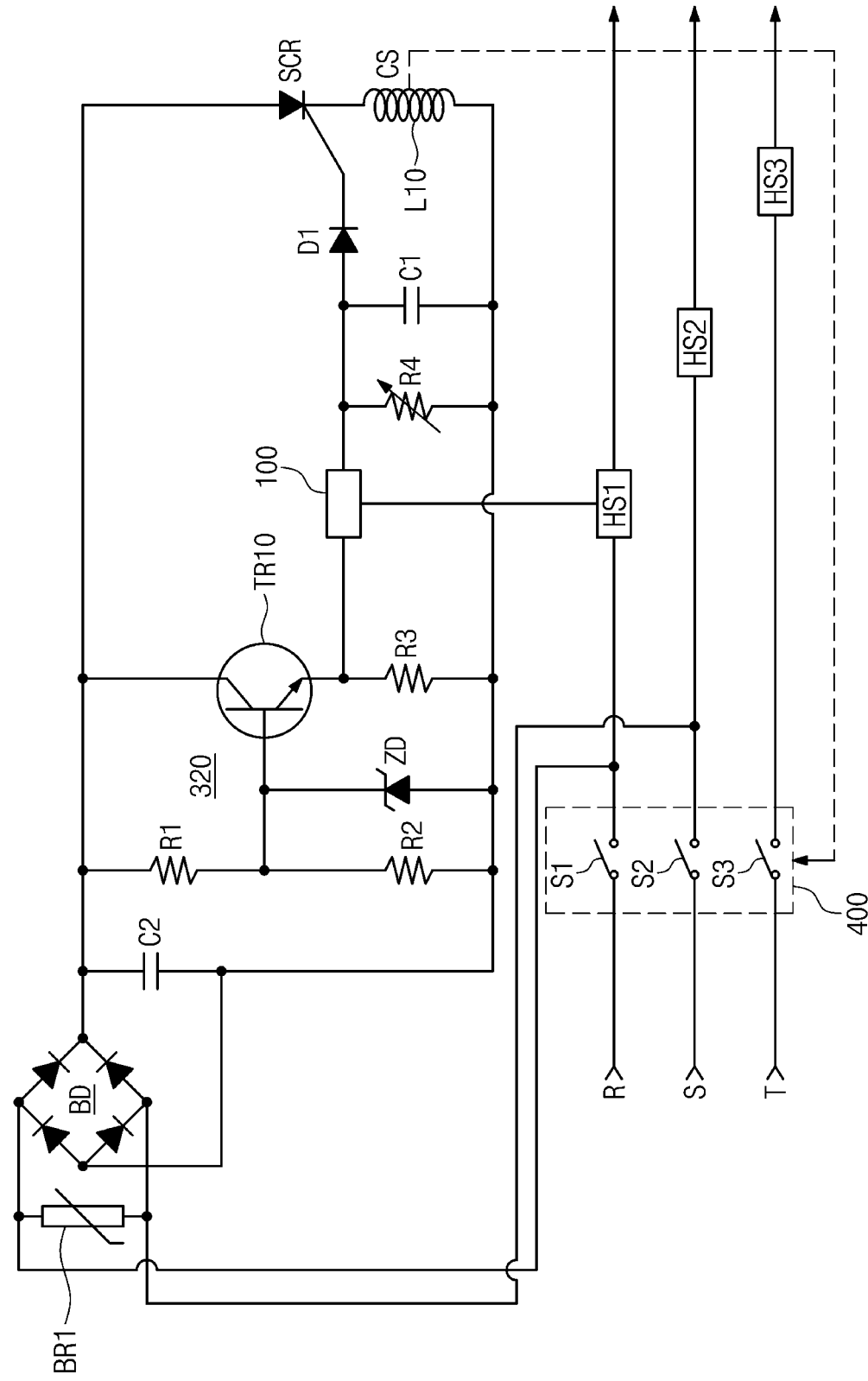
FIG. 19 is a view showing an application example of another electrical switchgear according to an embodiment of the inventive concept.
Figure 20A:
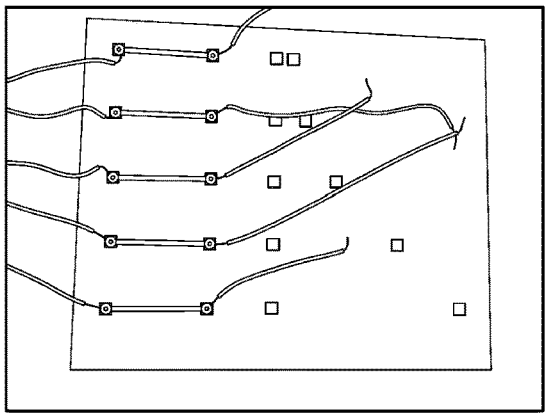
FIGS. 20(a) to 20(f) are views presented for explaining heats differed according to the size and material of wires in an embodiment of the inventive concept.
Figure 20B:
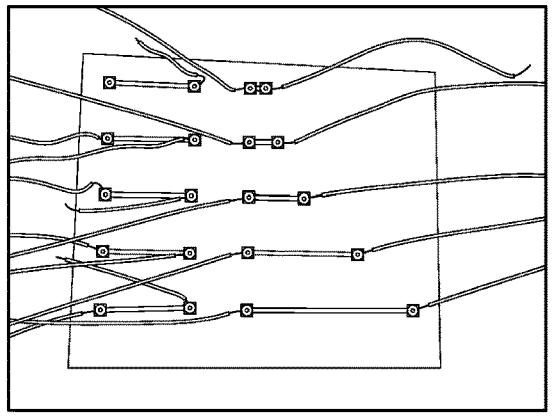
Figure 20C:
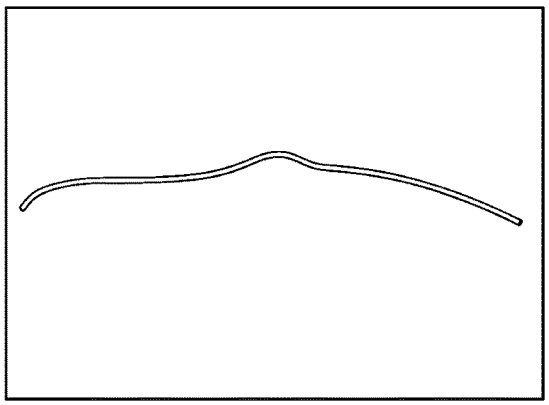
Figure 20D:
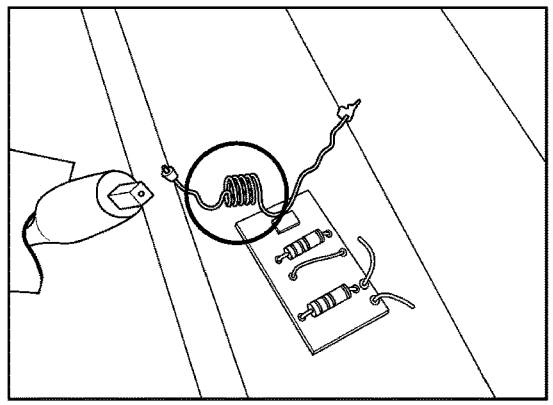
Figure 20E:
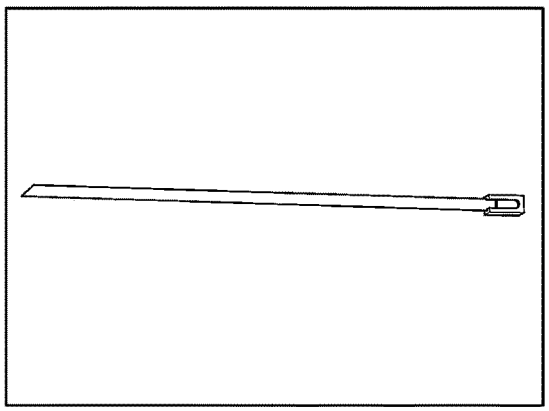
Figure 20F:
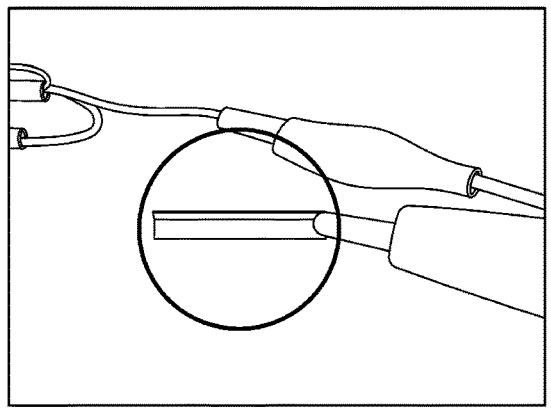

The magnetic contactor in the electrical switchgear may correspond to a manual switch and an electro-magnet in the circuit breaker. An application circuit according thereto is illustrated in FIG. 19.

FIG. 16 illustrates an electrical switchgear for directly controlling a magnetic contactor (i.e. electro-magnet) with AC 220V voltage using a triac TRA1.

When AC 220 V voltage is applied between terminals T2 and T1 of the triac TRA1, the electro-magnet becomes an activation state. An inactivation state of the electro-magnet, namely, an Off operation is realized by cutting off gate current of the triac TRA1. For controlling the gate current of the triac TRA1 and an SCR1, DC power is used as control power.

Firstly, when the power is On, an AC magnetic contactor, namely, an electro-magnet is turned on. Thereafter, when large current flows through the power line and the temperature of the critical temperature device 100 reaches a critical temperature, the SCR is turned on and current, which has flowed to the gate of the triac TRA1, flows from an anode to a cathode of the SCR1. Accordingly, terminals T2 and T1 of the triac TRA1 are electrically cut off. A monitoring system MS operates by current flowing from the anode to the cathode of the SCR1 and an LED connected to the monitoring system MS may emit light.

When the SCR is turned on and the triac is turned off, the monitoring system MS generates a buzzer sound notifying a cutoff signal of the electrical switchgear or outputs a communication signal for warning.

Figure 17:
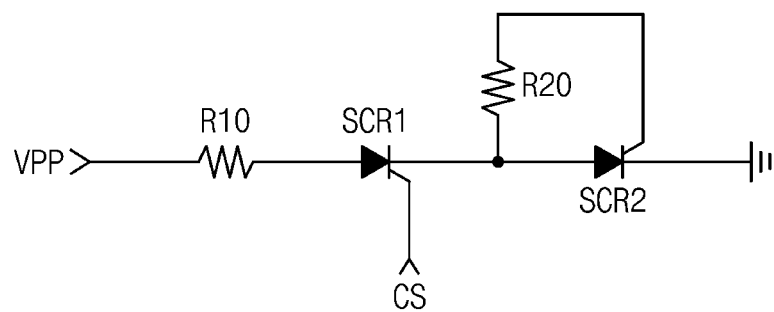
FIG. 17 is a protection circuit diagram for preventing damage of an SCR, which is applied to an embodiment of the inventive concept.

The circuit of FIG. 16 further includes SCR1 and SCR2 on the basis of a circuit principle of FIG. 17. In other words, the two SCRs are connected in serial in order to prevent the SCRs from being damaged due to a high voltage applied thereto.

On the other hand, one of constant voltage circuits as illustrated in FIGS. 13A to 13D may be applied such that an overvoltage is not applied to the MIT-CTS 100. Resistors used in the circuit of FIG. 16 were R1=20 kΩ, R2=450 kΩ, R3=10 kΩ, R4=20 kΩ, R5=820 kΩ, R6=15 kΩ, R7=1 kΩ, and R8=1 kΩ. A capacitor C1 was 10 nF. The monitoring system MS employed a power LED. As a transistor TR10, 2N3904 was used, and as the SCRs, P0115DA 5AL3 was used. R6 may be replaced with a PN junction diode for environmental temperature correction. The capacitor C1 was used for a signal delay in order to prevent malfunction by an overshooting noise signal at the time of inputting power. As the triac TRA1, AC TO-200 package was used. The MIT-CTS 100 has 1 MΩ at a room temperature and several hundred ohms at a critical temperature or higher. Here, a DC voltage is set to 220V or higher in order to turn on the gate of the triac TRA1. Since such a DC voltage corresponds to a very high value at the time when the SCR is tuned on, it is necessary to reduce a voltage without reducing current. Typically, when a high voltage is applied to one SCR, the SCR may be burnt out by the high voltage at the time of operation of the SCR.

Furthermore, a diode D2 is connected between the critical temperature device 100 and the gate of the SCR in order to prevent the critical temperature device 100 from being damaged by a high voltage input through the gate of the SCR. In addition, a diode D1 is connected between the gate of the triac and a resistor R5 in order to cut off a high AC voltage from being input through the gate of the triac.

The circuit of FIG. 16 may include a constant voltage circuit 300 for applying a low and stable voltage to a first terminal 1 of the critical temperature device 100.

The constant voltage circuit 310 may include a voltage follower structure using resistors R1 to R4 and an NPN transistor TR10. In addition, the constant voltage circuit 310 may be similarly configured to those of FIGS. 13A to 13D.

FIG. 17 is a protection circuit diagram for preventing damage of SCR, which is applied to an embodiment of the inventive concept.

FIG. 17 illustrates a circuit structure in which two or more SCRs are connected in serial. A control voltage is applied to a gate of a first SCR1, and a gate of a second SCR2 is connected to an anode thereof through a resistor R20. Such a structure is necessary for applying a high voltage to the SCR.

Figure 18A:
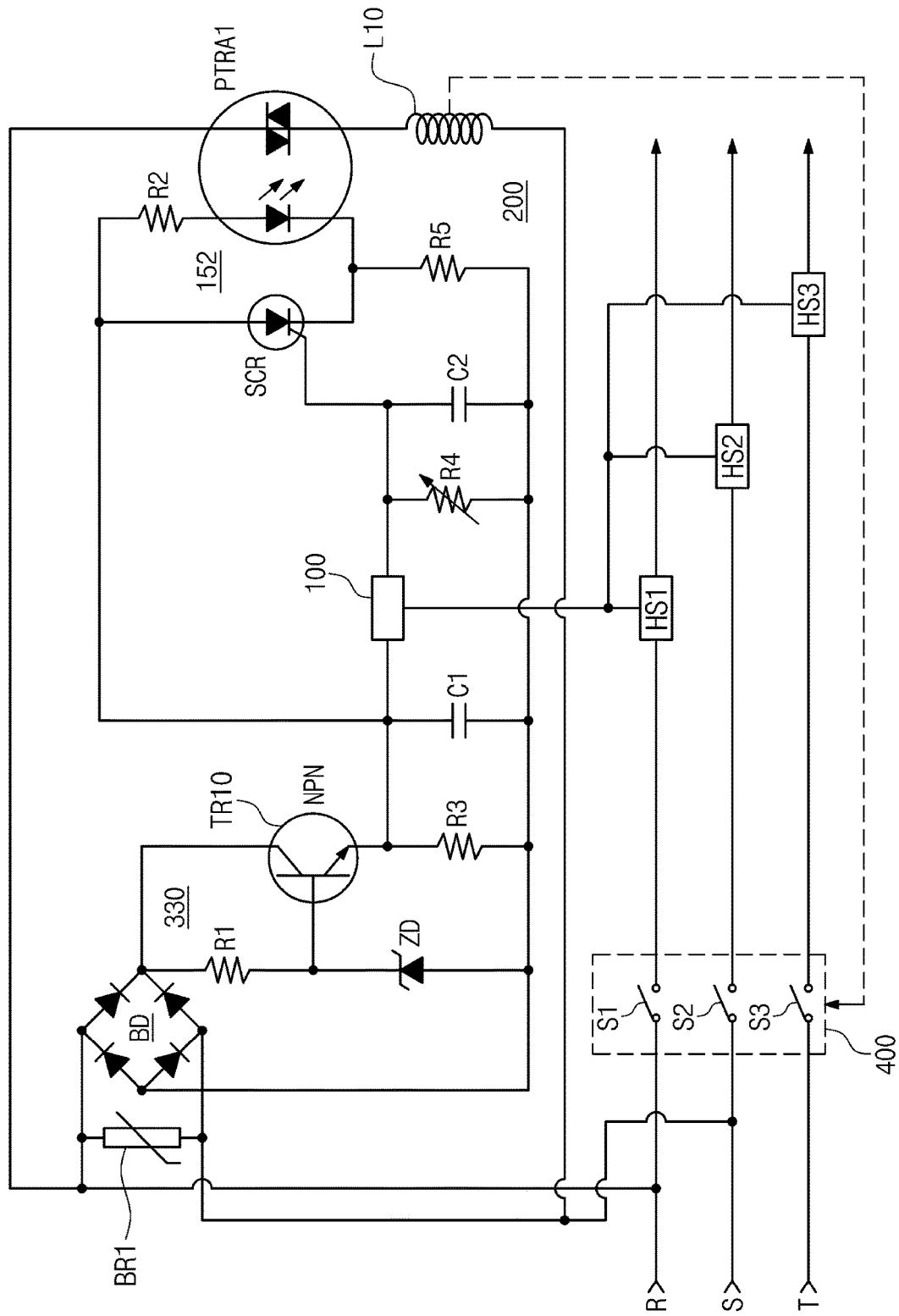
FIGS. 18A and 18B illustrate application examples of an electrical switchgear according to an embodiment of the inventive concept.
Figure 18B:
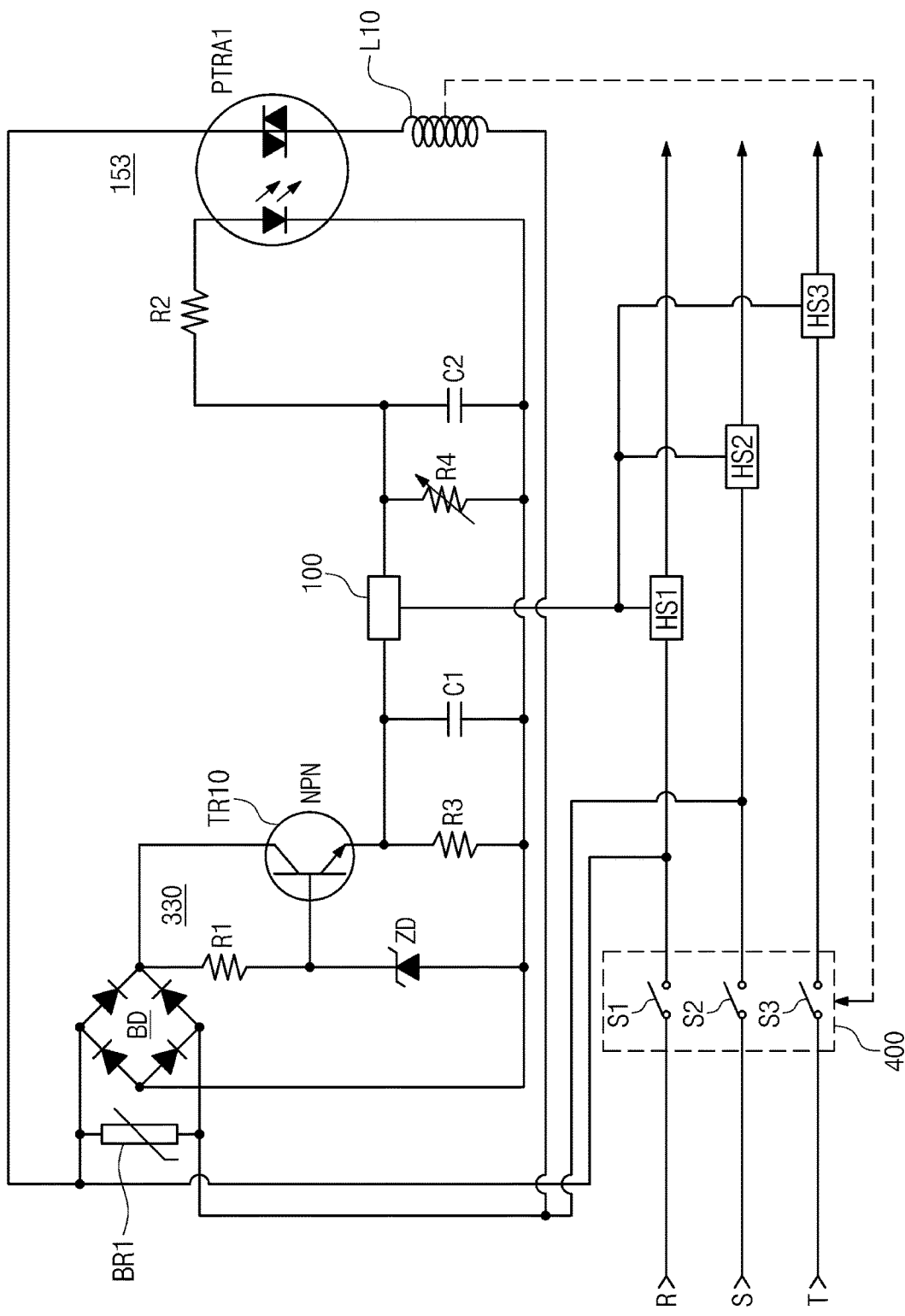

FIGS. 18A and 18B illustrate application examples of an electric switchgear according to an embodiment of the inventive concept.

FIG. 18A illustrates that a phototriac PTRA1 is used as an electro-magnetic driving switch 152 for controlling an electro-magnet with AC current.

Accordingly, an electro-magnet of the magnetic contactor for an AC control is controlled in an activated state or an inactivated state.

FIG. 18A illustrates an electrical switchgear for directly controlling a magnetic contactor (i.e. electro-magnet) with AC 220V voltage using the phototriac PTRA1.

When AC 220 V voltage is applied between a terminal MT2 (anode) and a terminal MT1 (cathode) of the phototriac PTRA1, an electro-magnet becomes an activated state. An inactivation state of the electro-magnet, namely, an Off operation is realized by cutting off current between the anode and cathode. For controlling current of a photo diode and the SCR, DC power is used as control power.

In FIG. 18A, power is brought from power lines R, S, and T and more particularly, from a front stage of the AC magnetic contactor 400 in order to provide a phototriac control signal. When power is supplied through the power lines R, S, and T, current flows through the AC magnetic contactor 400, namely, the electro-magnet, and power in R, S, and T is connected to a power equipment side. Thereafter, when large current flows through the power lines and the temperature of the critical temperature device 100 reaches a critical temperature, the SCR is turned on and a voltage applied to an LED of the phototriac PTRA1 is reduced. Accordingly, the current flowing through the photo LED of the phototriac PTRA1 decreases to electrically cut off the terminals MT2 and MT1 of the phototriac PTRA1, and the current toward the magnetic contactor 400 is stopped flowing and the power is off.

A monitoring system MS operates by current flowing from the anode to the cathode of the SCR1 and an LED connected to the monitoring system MS may emit light.

The SCR is turned on and when the triac is turned off, the monitoring system MS generates a buzzer sound notifying a cutoff signal of the electrical switchgear or outputs a communication signal for warning.

On the other hand, one of constant voltage circuits, as illustrated in FIGS. 13A to 13D, may be applied such that an overvoltage is not applied to the MIT-CTS 100. In order to realize the monitoring function in the monitoring system MS, a buzzer, an LED, an Ethernet, or Bluetooth communication, etc may be used. R4 may be replaced with a PN junction diode for environmental temperature correction. The capacitor C1 is used for a signal delay in order to prevent malfunction by an overshooting noise signal at the time of inputting power. The MIT-CTS 100 has 1 MΩ at a room temperature and several hundred ohms at a critical temperature or higher. Here, a DC voltage is set to 5V or higher in order to turn on the gate of the triac TRA1.

A circuit of FIG. 18A may include a constant voltage circuit 330 for applying a low and stable voltage to a first terminal 1 of the critical temperature device 100.

The constant voltage circuit 330 may include a voltage follower structure using resistors R1 to R5 and an NPN transistor TR10. In addition, the constant voltage circuit 330 may be configured similarly to those of FIGS. 13A to 13D.

Furthermore, for FIG. 18B, the phototriac PTRA1 is used as the electro-magnetic driving switch 153, and power is brought from power lines R, S, and T and more particularly, from a rear stage of the manual switch 400 in order to provide a phototriac control signal (this part is different from that of FIG. 18A). In this case, the magnetic contactor is changed into a manual switch. Compared to FIG. 18A, the SCR and R5 are absent in FIG. 18B and other elements remain. Although R, S, and T power lines are connected to a power equipment by the manual switch and power for the phototriac control is applied, the phototriac and electro-magnetic do not operate (this part is different from FIG. 18A). When large current flows through the power lines and the temperature of the critical temperature device at that time reaches a critical temperature, the photo diode inside the phototriac is turned on to operate the phototriac and to operate the electro-magnet, pestles inside the manual switch pull an operation part of the manual switch to turn off the manual switch and power is cut off. A circuit configuration of FIG. 18B may be used for cutting off overcurrent in a distribution breaker and an earth leakage breaker. FIG. 19 is a view showing an application example of an electrical switchgear according to an embodiment of the inventive concept.

FIG. 19 illustrates an application circuit applicable to overcurrent detection and control of the circuit breaker and the earth leakage breaker of the inventive concept. In other words, the circuit of FIG. 19 is a modification circuit of FIG. 14.

Firstly, at the time of normal operation, a manual cut-off seesaw switch 400 is turned on and AC currents flow through the power lines R, S, and T. The electro-magnet does not operate at this time. However, when overcurrents flow through the power lines, the critical temperature device MIT-CTS operates to control the SCR, the electro-magnet operates then, and mechanical pestles (like a trigger of a gun, fixed at a front part of the electro-magnet) pull the switch operation part. In other words, such a pulling force, namely, an attractive force pulls the operation part of the manual cut-off seesaw switch 400 to turn it off. At this point, the AC power lines are completely cut off, the current supplied to the electro-magnet is cut off. In this way, the current flowing through the power lines are completely cut off. Although the attractive force of the electro-magnet (force generated when the current flows through the electro-magnet) in the electrical switchgear plays a role for connecting the power lines through the magnetic contactor, it plays, in the circuit breaker, an opposite role of cutting off power lines, which are manually connected to the manual switch through the attractive force of the electro-magnet.

In FIG. 19, the electro-magnet driving switch is realized by the SCR, which is controlled by the critical temperature device 100. In other words, the gate of the SCR is controlled by the critical temperature device 100 and accordingly the current flows from the anode to the cathode of the SCR. Accordingly, the electro-magnet becomes an active state to cut off power.

A current control resistor R4 is connected in parallel to the electro-magnet so that constant current flows to the SCR, and a capacitor may be connected to the current control resistor in parallel. The current control resistor R4 may be realized with a PN junction diode.

A backflow prevention diode for protecting a critical temperature device is further connected to the gate of the SCR.

The electro-magnet driving switch may be realized with a transistor, a triac, or a relay, besides the SCR.

The circuit of FIG. 19 may be applied to a distribution breaker having an overcurrent cut-off function and an earth leakage breaker having a leakage breaking function.

FIG. 20 is views presented for explaining heating differed according to the size and material of wires in an embodiment of the inventive concept.

FIGS. 20(a) to 20(f) show thermal experiments of various kinds of wires (nichrome wire, copper wire and brass wire, and steel wire). For a load, a radiator of 2500 W and a copper wire of 0.1Ω or smaller, nichrome wire 1 of 130×1 mm and 0.8Ω, brass (inside a thermal overload relay) of 0.2Ω, stainless steel 1 of 150×4 mm and 0.5Ω, stainless steel 2 of 30×4 mm and 2Ω were used. A table of the results is shown below. A PCB copper plate of 1 ounce (thickness thereof is 35 mm) was used. The brass is a kind of copper alloy.

TABLE 1

<Experiment data>

| Division | Dimensions | Current 4 A (° C.) | Current 6 A (° C.) | Current 10 A (° C.) |
|---|---|---|---|---|
| Copper wire 1 | 30 × 0.5 mm | 35 | 54 | Burnt |
| Copper wire 2 | 30 × 1 mm | 32 | 42.7 | 82 |
| Copper wire 3 | 30 × 1.5 mm | 30 | 35.6 | 54 |
| Copper wire 4 | 30 × 2 mm | 30 | 33 | 45.6 |
| Copper wire 5 | 30 × 3 mm | 28.5 | 30.5 | 39.9 |
| Copper wire 6 | 5 × 1 mm | 31.4 | 35.4 | 46.4 |
| Copper wire 7 | 10 × 1 mm | 30.2 | 35.5 | 53 |
| Copper wire 8 | 20 × 1 mm | 32 | 39 | 68.5 |
| Copper wire 9 | 40 × 1 mm | 33 | 44.4 | 80.2 |
| Copper wire 10 | 60 × 1 mm | 34 | 46.8 | 95 |
| Stainless steel 1 | 150 × 4 mm | 36.2 | 53.9 | 102.5 |
| Stainless steel 2 | 30 × 4 mm | 53 | 85 | 163 |
| Nichrome wire 1 | 130 × 1 mm | 79 | 168 | 240 or greater |
| Brass | (yellow) | 36.1 | 45.2 | |

The foregoing experiment data shows that a degree of heating becomes differed according to a material, the width and length of the wire, and wire heating may be adjusted to the critical temperature of the critical temperature device according to a wire design.

Since an electric switch gear according to the present inventive concept does not only use a mechanical relay causing spike discharge with a bimetal but a simple circuit and a part for controlling overcurrent are also included inside the magnetic contactor, miniaturization of the electrical switchgear is possible.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An electrical switchgear comprising:
    an electro-magnet configured to switch on and off current through a power line to a load based on a power control signal, the load comprising power equipment;
    a heating wire configured to generate heat according to the current in the power line, such that a level of heat generated varies according to a magnitude of the current;
    a critical temperature device having an input terminal, and output terminal, and a temperature-sensing terminal, the temperature-sensing terminal configured to vary in temperature according to the level of heat generated by the heating wire, the critical temperature device being a metal-insulator transition device comprising vanadium oxide connected between the input terminal and the output terminal, the critical temperature device having an output current value that varies on a basis of a resistance value that changes from high resistance to low resistance with increasing temperature, the resistance value changing by at least three orders of magnitude at a critical temperature, the output current value varying according to a temperature of the temperature-sensing terminal; and
    an electro-magnet control unit comprising an electro-magnet driving switch device and an electro-magnet cut off switch device, the electro-magnet driving switch device receiving an input signal based on the power control signal and outputting an output signal to drive the electro-magnet, the electro-magnet cut off switch device configured to allow the output signal to drive the electro-magnet in a first on/off state and to prevent the output signal from driving the electro-magnet in a second on/off state in response to the output current value of the critical temperature device.

2. The electrical switchgear of claim 1, wherein the power equipment is at least one of a motor, a heater, an LED, or a lamp.

3. The electrical switchgear of claim 1, wherein the power signal is AC or DC current.

4. The electrical switchgear of claim 1, wherein the heating wire is electrically connected between the critical temperature device and the power line.

5. The electrical switchgear of claim 1, wherein
    the input terminal is connected to a control input stage,
    the output terminal connected to a control output stage, and
    the temperature-sensing terminal is insulated from the input and output terminals and is connected to the heating wire that generates heat according to the current in the power line.

6. The electrical switchgear of claim 5, further comprising: at least one thermal insulation device connected between the heating wire and the temperature-sensing terminal to provide thermal insulation from the heating wire.

7. The electrical switchgear of claim 6, wherein the thermal insulation device comprises:
    a plurality of channels connected in parallel between the heating wire and the temperature-sensing terminal, each of the plurality of channels having a different thermal insulation level; and a switch configured to select one of the plurality of channels to connect the heating wire with the temperature-sensing terminal to thereby adjust a thermal insulation level.

8. The electrical switchgear of claim 1, further comprising: a constant voltage circuit configured to apply a constant voltage to the critical temperature device.

9. The electrical switchgear of claim 8, wherein the constant voltage circuit comprises a voltage follower structure using a resistor and an NPN transistor.

10. The electrical switchgear of claim 8, wherein the constant voltage circuit comprises a voltage follower structure using a resistor and a PNP transistor.

11. The electrical switchgear of claim 8, wherein the constant voltage circuit comprises a voltage follower structure using a resistor and an FET transistor.

12. The electrical switchgear of claim 8, wherein the constant voltage circuit comprises a voltage follower structure using a resistor, an NPN transistor, and a Zener diode.

13. The electrical switchgear of claim 1, wherein the critical temperature device is correspondingly connected to power lines when the power lines are installed in plural numbers.

14. The electrical switchgear of claim 1, wherein the heating wire comprises at least one of a copper wire, a brass wire, a nichrome wire, a copper alloy wire, a nichrome alloy wire, or a ferroalloy wire.

15. The electrical switchgear of claim 14, wherein the heating wire is provided with a wire having a higher temperature coefficient than that of the power line.

16. The electrical switchgear of claim 14, wherein the heating wire is provided by reducing a width of the power line.

17. The electrical switchgear of claim 14, wherein the heating wire is furcated from the power line to be connected to a thermal terminal of the critical temperature device, such that the power line has a constant width and is unbroken along a segment of a predetermined length, the heating wire is connected in parallel with the segment, and the temperature-sensing terminal is connected to the heating wire between opposite ends of the segment.

18. The electrical switchgear of claim 14, wherein the heating wire is provided electrically in parallel to the power line with a material different from that of the power line on a top portion of the power line and is connected to a thermal terminal of the critical temperature device to allow heating of the heating wire to be higher than that of the power line.

19. The electrical switchgear of claim 14, wherein the heating wire is connected to a front stage of the thermal terminal of the critical temperature device electrically serially connected to the power line and is provided with a material having a temperature coefficient different from that of the power line to allow heating of the thermal terminal to be higher than that of the power line.

20. The electrical switchgear of claim 1, wherein the electro-magnet control unit comprises at least one of a transistor, a triac, and a relay as the electro-magnet driving switch device.

21. The electrical switchgear of claim 20, wherein the electro-magnet control unit comprises at least one of an electro-magnet transistor, a silicon controlled rectifier (SCR), a triac, and a relay as the electro-magnet cut off switch device.

22. The electrical switchgear of claim 21, wherein the electro-magnet driving switch device is configured with an NPN transistor, and when the electro-magnet cut off switch device is configured with the SCR, a gate of the SCR is connected to an output of the critical temperature device, an anode of the SCR is connected to a base of the NPN transistor, and at a time of turning on the SCR, the electro-magnet driving switch device is turned off, the output signal does not flow to the electro-magnet, and then a function of the electro-magnet is lost.

23. The electrical switchgear of claim 22, further comprising:
a resistance element implemented with a PN junction diode between the gate and a cathode of the SCR.

24. The electrical switchgear of claim 23, further comprising:
a capacitor connected in parallel to the resistance element between the gate and a cathode of the SCR.

25. The electrical switchgear of claim 22, further comprising:
a constant voltage circuit configured to receive a first DC voltage to generate a second DC voltage smaller that the first DC voltage, and the second DC voltage is applied to the critical temperature device.

26. An electrical switchgear comprising:
an electro-magnet configured to switch on and off current through a power line to a load in response to a flow of AC control current, the load comprising power equipment;
a heating wire configured to generate heat according to the current in the power line, such that a level of heat generated varies according to a magnitude of the current;
a critical temperature device having an input terminal, and output terminal, and a temperature-sensing terminal, the temperature-sensing terminal configured to vary in temperature according to the level of heat generated by the heating wire, the critical temperature device being a metal-insulator transition device comprising vanadium oxide connected between the input terminal and the output terminal, the critical temperature device having an output current value that varies, on a basis of a resistance value that changes from high resistance to low resistance with increasing temperature, the resistance value changing by at least three orders of magnitude at a critical temperature, the output current value varying according to a temperature of the temperature-sensing terminal; and
an electro-magnet control unit comprising an electro-magnet driving switch device and an electro-magnet cut off switch device, the electro-magnet driving switch device receiving an input signal based on the AC control current and outputting an AC output signal to drive the electro-magnet, the electro-magnet cut off switch device configured to allow the AC output signal to drive the electro-magnet in a first on/off state and to prevent the AC output signal from driving the electro-magnet in a second on/off state in response to the output current value of the critical temperature device.

27. The electrical switchgear of claim 26, wherein the electro-magnet driving switch device is configured with a triac, and when the electro-magnet cut off switch device is configured with an SCR, a gate of the SCR is connected to an output of the critical temperature device, and an anode of the SCR is connected to a gate of the triac, and at a time of turn-on of the SCR, the triac is turned off, the AC control current does not flow to the electro-magnet, and a function of the electro-magnet is lost.

28. The electrical switchgear of claim 27, further comprising: a resistance element configured with a PN junction diode between the gate and a cathode of the SCR.

29. The electrical switchgear of claim 28, further comprising: a capacitor connected in parallel to the resistance element between the gate and a cathode of the SCR.

30. The electrical switchgear of claim 27, further comprising: a gate resistor and a diode for preventing high voltage inflow between the gate of the SCR and the gate of the triac.

31. The electrical switchgear of claim 27, further comprising: a backflow prevention diode connected between the gate of the SCR and an output port of the critical temperature device.

32. The electrical switchgear of claim 27, further comprising: a monitoring device configured to generate a sound, an alarm, or a communication signal in response to current flowing through the cathode of the SCR at a time of turning on the triac.

33. The electrical switchgear of claim 26, further comprising: a constant voltage circuit configured to receive a first DC voltage for preventing damage of the critical temperature device to generate a second DC voltage lower than the first DC voltage, and configured to apply the second DC voltage to the critical temperature device.

34. The electrical switchgear of claim 27, wherein the triac, the critical temperature device, and the SCR are installed inside a magnetic contactor.

35. The electrical switchgear of claim 26, wherein when the electro-magnet driving switch device is configured with a triac, and the electro-magnet cut off switch device is configured with first and second SCRs connected in series for preventing breakdown, a gate of the first SCR is connected to an output of the critical temperature device and an anode of the first SCR is connected to a gate side of the triac.

36. The electrical switchgear of claim 26, wherein when the electro-magnet driving switch device is configured with a phototriac and the electro-magnet cut off switch device is configured with an SCR, the SCR and the phototriac are connected in parallel, and at a time of turning on the SCR, the triac is turned off and AC control current does not flow, and a function of the electro-magnet is lost.

37. The electrical switchgear of claim 36, further comprising: a resistance element configured with a PN junction diode between the gate and a cathode of the SCR.

38. The electrical switchgear of claim 37, further comprising: a capacitor connected in parallel to the resistance element between the gate and a cathode of the SCR.

39. The electrical switchgear of claim 36, further comprising: a monitoring device configured to generate a sound, an alarm, or a communication signal in response to current flowing through the cathode of the SCR at a time of turning off the triac.

40. The electrical switchgear of claim 36, further comprising: a constant voltage circuit configured to receive a first DC voltage for preventing damage of the critical temperature device to generate a second DC voltage lower than the first DC voltage, and configured to apply the second DC voltage to the critical temperature device.

41. The electrical switchgear of claim 36, wherein the triac, the critical temperature device, and the SCR are installed inside a magnetic contactor.

42. The electrical switchgear of claim 32, wherein the electrical switchgear is available for preventing overcurrent in a distribution breaker and an earth leakage breaker.

* * * * *